United States Patent
Sugata et al.

(10) Patent No.: US 9,620,766 B2
(45) Date of Patent: Apr. 11, 2017

(54) MULTI-LAYER POLYOLEFIN POROUS MEMBRANE, BATTERY SEPARATOR USING SAME, AND PROCESS FOR PRODUCING MULTI-LAYER POLYOLEFIN POROUS MEMBRANE

(71) Applicant: TORAY BATTERY SEPARATOR FILM CO., LTD., Nasushibora-shi, Tochigi Prefecture (JP)

(72) Inventors: Masami Sugata, Tochigi (JP); Koichi Matano, Tochigi (JP); Naoki Mizuno, Tochigi (JP); Kosuke Harumoto, Tochigi (JP)

(73) Assignee: TORAY BATTERY SEPARATOR FILM CO., LTD., Tochigi (JP)

( * ) Notice: Subject to any disclaimer, the term of this patent is extended or adjusted under 35 U.S.C. 154(b) by 0 days.

(21) Appl. No.: 15/031,237

(22) PCT Filed: Mar. 10, 2015

(86) PCT No.: PCT/JP2015/057055
§ 371 (c)(1),
(2) Date: Apr. 21, 2016

(87) PCT Pub. No.: WO2015/146579
PCT Pub. Date: Oct. 1, 2015

(65) Prior Publication Data
US 2017/0005321 A1    Jan. 5, 2017

(30) Foreign Application Priority Data

Mar. 26, 2014 (JP) ................................ 2014-064596
Mar. 26, 2014 (JP) ................................ 2014-064599
(Continued)

(51) Int. Cl.
*H01M 2/34* (2006.01)
*H01M 10/0525* (2010.01)
(Continued)

(52) U.S. Cl.
CPC ......... *H01M 2/348* (2013.01); *B29C 47/0057* (2013.01); *B29C 47/065* (2013.01);
(Continued)

(58) Field of Classification Search
CPC .................................................... H01M 2/348
(Continued)

(56) References Cited

U.S. PATENT DOCUMENTS 6,824,865 B1 * 11/2004 Funaoka ............ B01D 67/0009
428/220
2010/0295511 A1    11/2010 Kikuchi et al.
2011/0143185 A1 *  6/2011 Nishikawa ............ H01M 2/162
429/145

FOREIGN PATENT DOCUMENTS

JP    2001-200081 A    7/2001
JP    2012-076255 A    4/2012
(Continued)

OTHER PUBLICATIONS

International Search Report dated Jun. 16, 2015 for International Application No. PCT/JP2015/057055, 2 pages. (English Translation).
(Continued)

*Primary Examiner* — Basia Ridley
*Assistant Examiner* — James Erwin
(74) *Attorney, Agent, or Firm* — Kilpatrick Townsend & Stockton LLP

(57) ABSTRACT

Considering that battery separators will require further thinner materials and lower costs in the future, a battery separator of the present invention, in which multi-layer poly-
(Continued)

olefin porous membrane with exceptionally high peel strength against a modified porous layer, suitable for high-speed processing during slit process and battery assembly process, and suitable for laminating on a multi-layer modified porous layer, and a multi-layer modified porous layer are laminated, is provided. A multi-layer polyolefin porous membrane comprising at least two or more layers, the multi-layer polyolefin porous membrane having a shutdown temperature in a range of 128 to 135° C., a rate of increase in air permeation resistance from 30° C. to 105° C. scaled to 20 μm thickness less than 1.5 sec/100 cc Air/° C., and a thickness not more than 20 μm.

7 Claims, 4 Drawing Sheets

(30) Foreign Application Priority Data

| | | |
|---|---|---|
| May 9, 2014 | (JP) | 2014-098154 |
| Sep. 9, 2014 | (JP) | 2014-183046 |

(51) Int. Cl.

| | |
|---|---|
| *H01M 2/16* | (2006.01) |
| *B29C 47/00* | (2006.01) |
| *B29C 47/06* | (2006.01) |
| *B32B 3/30* | (2006.01) |
| *B32B 27/32* | (2006.01) |
| *B29C 55/14* | (2006.01) |
| *B29K 23/00* | (2006.01) |
| *B29L 31/34* | (2006.01) |

(52) U.S. Cl.
CPC ............... *B32B 3/30* (2013.01); *B32B 27/32* (2013.01); *H01M 2/1653* (2013.01); *H01M 2/1686* (2013.01); *H01M 10/0525* (2013.01); *B29C 55/143* (2013.01); *B29K 2023/065* (2013.01); *B29K 2023/0683* (2013.01); *B29L 2031/3468* (2013.01); *B32B 2457/10* (2013.01); *H01M 2200/10* (2013.01)

(58) Field of Classification Search
USPC ......................................................... 429/144
See application file for complete search history.

(56) References Cited

FOREIGN PATENT DOCUMENTS

| | | |
|---|---|---|
| JP | 2012-521914 A | 9/2012 |
| WO | 2008/053898 A1 | 5/2008 |
| WO | 2013/153954 A1 | 10/2013 |
| WO | 2014/132791 A1 | 9/2014 |

OTHER PUBLICATIONS

Extended European Search Report dated Jul. 5, 2016 for European Application No. 15768474.7, 13 pages.

* cited by examiner

MULTI-LAYER POLYOLEFIN POROUS MEMBRANE, BATTERY SEPARATOR USING SAME, AND PROCESS FOR PRODUCING MULTI-LAYER POLYOLEFIN POROUS MEMBRANE

This application is a United States National Phase Application of co-pending International Patent Application Number PCT/JP2015/057055, filed Mar. 10, 2015 and entitled "MULTI-LAYER POLYOLEFIN POROUS MEMBRANE, BATTERY SEPARATOR USING SAME, AND PROCESS FOR PRODUCING MULTI-LAYER POLYOLEFIN POROUS MEMBRANE", which Application claims priority to Japanese Patent Application No. 2014-064596, filed with the Japanese Patent Office on Mar. 26, 2014, to Japanese Patent Application No. 2014-064599, filed with the Japanese Patent Office on Mar. 26, 2014, to Japanese Patent Application No. 2014-098154, filed with the Japanese Patent Office on May 9, 2014, and to Japanese Patent Application No. 2014-193046, filed with the Japanese Patent Office on Sep. 9, 2014, the contents of which are incorporated herein by reference in their entirety.

TECHNICAL FIELD

The present invention relates to a multi-layer polyolefin porous membrane that is suitable for laminating a modified porous layer and a battery separator. The battery separator is useful as a lithium-ion battery separator.

BACKGROUND

Thermoplastic resin microporous membranes are used widely as a material for separation, selective transmission, isolation of substances, and the like. For example, the usage includes battery separators for lithium ion rechargeable batteries, nickel-metal hydride batteries, nickel-cadmium batteries, or polymer batteries, separators for electric double layer capacitors, various filters such as reverse osmosis filtration membrane, ultrafiltration membrane, microfiltration membrane and the like, moisture permeation waterproof clothes, medical materials and the like. Especially, polyethylene porous membranes are preferably used as separators for lithium ion rechargeable batteries. This is because the membrane exhibits ion permeability due to electrolytic solution impregnation and possesses not only excellent electrical insulating properties, electrolytic solution resistance, and anti-oxidation properties, but also pore blocking effect, which block the electrical current to prevent excessive temperature increase at the temperature range of about 120 to 150° C. in abnormal temperature increase in batteries. However, if the temperature continues to increase even after the pore blocking for some reason, the decrease in viscosity of the polyethylene that configures the membrane and the shrinkage of the membrane may lead to membrane puncture at a certain temperature. This phenomenon is not limited to polyethylene. Even if the other thermoplastic resin is used, this phenomenon cannot be avoided at the temperature equal to or above the melting point of the resin, which configures the porous membrane.

Especially, separators for lithium-ion batteries greatly affect battery characteristics, battery productivity and battery safety, and require good mechanical properties, heat resistance, permeability, dimensional stability, pore blocking characteristics (shut down characteristics), membrane melt-puncture characteristics (melt-down characteristics) and the like. Furthermore, they require improved adhesion to an electrode material for improvement in cycle characteristics of batteries and improved wettability toward electrolytic solution for productivity improvement.

In order to fulfill these requirements, from the viewpoint of shut-down characteristics, methods in which a low-melting point ingredient is added to a polyolefin microporous membrane have been disclosed. However, there have been problems in that the addition of the low melting point resin has a tendency to increase air permeation resistance during manufacturing of the porous membrane, and, moreover, a tendency to decrease the strength of the microporous membrane.

Furthermore, various modified porous layers laminated on a porous layer have been proposed previously from the viewpoint of heat resistance. As modified porous layers, polyamideimide resin, polyimide resin, and polyamide resin, which have both good heat resistance and good wettability toward electrolytic solution, and/or fluorine-based resin, which exhibits good adhesion toward electrodes are preferably used. A modified porous layer described in the present invention refers to a layer that includes resin, which provides or improves at least one of the functions among heat resistance, adhesion to an electrode material, wettability toward electrolytic solution and the like.

Furthermore, it is necessary to increase the area not only of an electrode but also of a separator to fill a container in order to increase battery capacity. Therefore the decrease in thickness of the separator is expected. However, since the thinner porous membrane may experience deformation in its planar directions, a modified porous layer laminated on a thin porous membrane in a battery separator may delaminate during processing, the slit process, or the battery assembly process and the safety may be compromised.

In addition, significant reduction in battery assembly process time is expected to facilitate cost reduction. Therefore an improvement in adhesion, which can withstand such a high-speed process with few problems such as delamination of modified porous layers, is required. However, when the resin included in the modified porous layer is sufficiently permeated into the polyolefin porous membrane, which is a substrate, in order to improve the adhesion, large increases in air permeation resistance have been problematic. Particularly, when a low-melting point ingredient is added to improve shut-down characteristics, there has been a problem in that air permeation resistance further increases, because the pores tend to be closed by heat generated during the modified porous layer formation.

In Patent Document 1, a method of manufacturing a microporous membrane by stretching a layer, which includes low-melting point polymer, and a layer, which does not include low-melting point polymer, is disclosed.

In Patent Document 2, polyvinylidene fluoride is coated on a 9 μm thick polyethylene porous membrane, and a fraction of polyvinylidene fluoride resin penetrates into fine pores of the polyethylene porous membrane to exhibit anchor effect. The resultant composite porous membrane with a peel strength (T-peel strength) of 1.0 to 5.3 N/25 mm at the interface between the polyethylene porous membrane and the polyvinylidene fluoride coating is disclosed.

In Patent Document 3, a heat-resistant porous layer, which contains acrylic resin and a N-vinyl acetamide polymer or thickener of water soluble cellulose derivative and plate-like boehmite, is disposed on a 16 μm thick, corona-discharge treated polyethylene porous membrane. The resultant separator with a 180° peel strength (T-peel strength) of 1.1 to 3.0 N/10 mm at the interface between the polyethylene porous membrane and the heat-resistant porous layer is disclosed.

In Patent Document 4, the method of producing a porous membrane is disclosed, in which polyethylene solution that comprises 30 wt. % of polyethylene composition (20 wt. % of high molecular weight polyethylene (UHMWPE) with a weight average molecular weight of $2.0 \times 10^6$, 80 wt. % of high density polyethylene (HDPE) with a weight average molecular weight of $3.5 \times 10^5$, and antioxidant) and 70 wt. % of liquid paraffin are extruded from an extruder at 190° C., and the extrudate is wound by a chill-roll kept at 50° C. The resultant gel-like product is stretched biaxially to the magnification of 5×5, and the porous membrane is obtained.

In Patent Document 5, the method of producing a microporous membrane is disclosed, in which polyethylene solution similar to that in Patent Document 3 is extruded from an extruder, and the extrudate is wound by a chill-roll kept at 0° C. The resultant gel-like product is stretched biaxially to the magnification of 5×5, and the microporous membrane is obtained.

In Working Example 1 of Patent Document 6, a polyethylene solution that comprises 50 mass % of composition (47.5 mass % of polyethylene with a viscosity-average molecular weight of 200,000, 2.5 mass % of polypropylene with a viscosity-average molecular weight of 400,000 and antioxidant) and 50 mass % of liquid paraffin is extruded from an extruder at 200° C. and the extrudate is wound by a chill-roll kept at 25° C. The resultant gel-like product is stretched biaxially to the magnification of 7×6.4, and a polyolefin resin porous membrane is obtained. A multi-layer porous membrane obtained by laminating a coating layer that comprises polyvinylalcohol and alumina particles on the surface of the polyolefin resin porous membrane is disclosed.

In Working Example 7 of Patent Document 6, a polyethylene solution that comprises 30 wt. % of polyethylene composition (weight average molecular weight of 4,150,000, weight average molecular weight of 560,000, and weight ratio of 1:9, respectively) and 70 wt. % of solvent mix of liquid paraffin and decalin is extruded from an extruder at 148° C. and the extrudate is cooled in a water bath. The resultant gel-like product is stretched biaxially to the magnification of 5.5×11.0, and a polyethylene porous membrane is obtained. A non-water-based separator for a rechargeable battery obtained by laminating a coating layer that comprises meta-type wholly aromatic polyamide and alumina particles on the surface of the polyethylene porous membrane is disclosed.

In Patent Document 8, a polyolefin microporous membrane with an embossed pattern of diagonal lattices obtained by passing a gel sheet before stretching between an embossing roll and a back-up roll is disclosed.

These conventional arts, however, were not sufficiently able to ensure low shut-down temperature and high permeability while providing a modified porous layer, when it is expected to speed up the manufacturing processes and to provide thinner separators, as anticipated by increased safety, lower cost and higher capacity in the near future. Also, these conventional arts, do not sufficiently ensure safety due to partial delamination of the modified porous layers during slit process or battery assembly process. Especially when the polyolefin resin porous membrane, which is a substrate, becomes thinner, it becomes more difficult to ensure safety sufficiently since it is more difficult to achieve enough anchoring of modified porous layers to the polyolefin resin porous membrane.

CITATION LIST

Patent Literature

Patent Document 1: Japanese Unexamined Patent Application Publication (Translation of PCT Application) No. 2012-521914A
Patent Document 2: Japanese Unexamined Patent Application Publication No. 2012-043762A
Patent Document 3: Re-publication of PCT International Publication No. 2010-104127A
Patent Document 4: Japanese Unexamined Patent Application Publication No. 2003-003006A
Patent Document 5: Japanese Unexamined Patent Application Publication No. 2004-083866A
Patent Document 6: Japanese Patent No. 4931083B
Patent Document 7: Japanese Patent No. 4460028B
Patent Document 8: WO/2008/053898

SUMMARY OF INVENTION

Technical Problem

Considering that battery separators will require further thinner materials and lower costs in the future, the present inventors provide a multi-layer polyolefin porous membrane with high permeability and low shut-down temperature even when the battery separator is provided with a modified porous layer, and is suitable for high-speed processing during slit process and battery assembly process and suitable for laminating on a modified porous layer, and a battery separator obtained by laminating a modified porous layer on the multi-layer polyolefin porous membrane with high permeability and low shut-down temperature even when the battery separator is provided with a modified porous layer, and is suitable for high-speed processing during slit process and battery assembly process and suitable for laminating on a modified porous layer.

Peel strength between a multi-layer polyolefin porous membrane and a modified porous layer in a separator, referred in the present disclosure, is a value obtained from the measurement described below (in some cases, it is also referred to as 0° peel strength).

FIG. 1 is a schematic side view of a laminated sample of a polyolefin porous membrane and a modified porous layer under tension provided by a tensile tester (not illustrated). Reference numeral 1 denotes a laminated sample, 2 denotes a multi-layer polyolefin porous membrane, 3 denotes a modified porous layer, 4 denotes a double-sided adhesive tape, 5 and 5' denote aluminum plates, and the arrow in the figure indicates the direction of tensile force. On the aluminum plate 5, 50 mm×25 mm in size and 0.5 mm in thickness, the double-sided adhesive tape 4 of the same size is adhered. The surface of the multi-layer polyolefin porous membrane 2 side of the sample 1 (the battery separator), cut out in the size of 50 mm in width and 100 mm in length, is adhered on the aluminum plate 5, so that the 40 mm portion of the sample, measured from one of the 25 mm long edges of the aluminum plate 5, is overlapped and adhered together, while the protruded portion is cut out. Next, a double-sided adhesive tape is adhered on one side of the aluminum plate 5', 100 mm in length, 15 mm in width and 0.5 mm in thickness. And the 20 mm portion of the sample, measured from one of the 25 mm long edges of the aluminum plate 5, is overlapped and adhered together. Then, using the tensile tester, the load is applied on the aluminum plate 5 and the aluminum plate 5' in parallel but in opposite directions, at a tensile velocity of 10 mm/min, and the strength at which the modified porous layer is delaminated is measured. When the peel strength measured by this evaluation method is not less than 100 N/15 mm, then there will be few incidents of delamination of the laminated modified porous layer during the transportation and the process, even if the thickness of the polyolefin porous membrane is not more than 10 µm, for example.

T-peel strength or 180° peel strength, both of which are conventionally used for peel strength measurement, is the peel force required to peel off the coating layer from the polyethylene porous membrane in the direction perpendicular or from perpendicular to diagonally backward, to the polyethylene porous membrane surface. Compared to these conventional evaluation methods, this evaluation method may provide the better evaluation in relation to the actual scratch resistance during the slit process and the battery assembly process.

Solution to Problem

In order to solve the problems described above, a battery separator of the present invention comprises a configuration below.

(1) A multi-layer polyolefin porous membrane comprising at least two or more layers, and having a shut-down temperature in a range of 128 to 135° C., a rate of increase in air permeation resistance from 30° C. to 105° C. scaled to 20 µm thickness less than 1.5 sec/100 cc Air/° C., and a thickness not more than 20 µm.

(2) A multi-layer polyolefin porous membrane according to (1), in which the air permeation resistance scaled to 20 µm thickness is in a range of 50 to 300 sec/100 cc Air.

(3) A multi-layer polyolefin porous membrane according to (1) or (2), in which a maximum shrinkage in a transverse direction is less than 5%.

(4) A multi-layer polyolefin porous membrane according to (1) to (3), in which protrusions of polyolefin have a size W within a range of 5 µm≤W≤50 µm and a height H within a range of 0.5 µm≤H, and are randomly disposed on one side of the multi-layer polyolefin porous membrane in density not less than 3/cm$^2$ and not more than 200/cm$^2$.

(5) A multi-layer polyolefin porous membrane according to (1) to (4), in which at least one of the layers includes resin with a melt flow rate in a range of 25 to 150 g/10 min and a melting point not less than 120° C. and less than 130° C.

(6) A battery separator comprising the multi-layer polyolefin porous membrane described in any one of (1) to (5), in which a modified porous layer is laminated on at least on a side with protrusions of the multi-layer polyolefin porous membrane.

(7) A method of manufacturing the multi-layer polyolefin porous membrane described in any one of (1) to (5), the method comprising the steps of:

(a) preparing a polyolefin resin solution configuring a layer A by melting and kneading after adding a forming solvent to polyolefin resin;

(b) preparing a polyolefin resin solution configuring a layer B by melting and kneading after adding a forming solvent to polyolefin resin;

(c) extruding the polyolefin solutions A and B obtained in the steps (a) and (b) through a die, chilling at least one of the polyolefin solutions by a chill-roll having a surface, the forming solvent thereon being removed by a means to remove the forming solvent, and forming a multi-layer gel-like product;

(d) stretching the gel-like product in MD (the machine direction) and in TD (the transverse direction) to obtain a stretched and molded material;

(e) extracting and removing the forming solvent from the stretched and molded material followed by drying, to obtain a multi-layer porous molded material; and (f) treating the porous molded material by heat to obtain a multi-layer polyolefin porous membrane.

(8) A method of manufacturing a multi-layer polyolefin porous membrane according to (7), in which the means to remove the forming solvent in step (b) is a doctor blade.

Advantageous Effects of Invention

According to the present invention, a multi-layer polyolefin porous membrane having an excellent permeability and shut-down characteristics even after a modified porous layer is provided and exceptionally good adhesion between modified porous layers, and a battery separator with a modified porous layer, which does not delaminate even during high-speed transport, laminated on the multi-layer polyolefin porous membrane, can be obtained.

DESCRIPTION OF EMBODIMENTS

Figure 1:
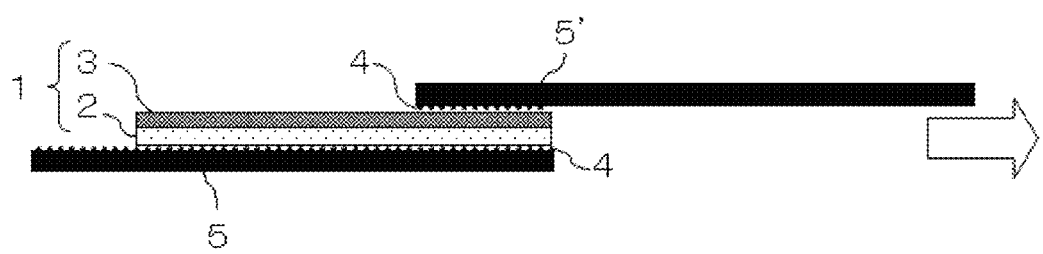
FIG. 1 is a schematic view of the measurement method for 0° peel strength.

The present invention is a multi-layer polyolefin porous membrane, manufactured using a specific polyolefin resin solution during manufacturing process, thereby the multi-layer polyolefin porous membrane exhibits little increase in air permeation resistance even when a modified porous layer is laminated, and has excellent shut-down characteristics. Also, another invention is a multi-layer polyolefin porous membrane having protrusions with appropriate shape and numbers on the surface, which can be obtained by controlling a cooling rate of the polyolefin resin solution extruded through a die from an extruder. Furthermore, another invention is the multi-layer polyolefin porous membrane, which, upon laminating a modified porous layer on the multi-layer polyolefin porous membrane, has an excellent peel strength against the modified porous layer, and exhibits little increase in air permeation resistance.

The increase in air permeation resistance described in the present invention is the difference between air permeation resistance of a multi-layer polyolefin porous membrane that is a substrate and air permeation resistance of a battery separator laminated with a modified porous layer. The increase in air permeation resistance is preferably not more than 90 sec/100 cc Air, more preferably 80 cc Air and even more preferably 50 cc Air.

Protrusions described in the present invention are fundamentally different from those obtained by adding inorganic particles, for example, to a multi-layer polyolefin porous membrane. The protrusions obtained by adding inorganic particles to a multi-layer polyolefin porous membrane are usually very low in their height, and forming the protrusions with height not less than 0.5 μm would require particles with diameters equal to or larger than the thickness of the multi-layer polyolefin porous membrane. However, addition of such particles would decrease the strength of the multi-layer polyolefin porous membrane and is unrealistic.

The protrusions described in the present invention are obtained by growing the parts of the multi-layer polyolefin porous membrane surface to appropriate shapes, and do not degrade the basic properties of the multi-layer polyolefin porous membrane.

Meanwhile, the randomly disposed protrusions described in the present invention are clearly different from the patterned or periodic arrangement of protrusions obtained by the process of an embossment roll before or after the stretching process during the manufacturing of the multi-layer polyolefin porous membrane. In principle, press working such as embossment forms protrusions by compressing the parts other than the protrusions, and is not preferable due to possible decrease in air permeation resistance and in wettability toward electrolytic solution.

The protrusions with appropriate size described in the present invention are not less than 5 μm and not more than 50 μm in size, and are not less than 0.5 μm in height. Namely, 5 μm≤W≤50 μm, where W is protrusion size and 0.5 μm≤H, where H is protrusion height. Such protrusions can function as anchors upon laminating the modified porous layer on the porous membrane, and a battery separator with a large 0° peel strength described above can be obtained as a result. Meanwhile, the upper limit of the protrusion height is not particularly limited, but the height of 3.0 μm may be sufficient. Larger population of protrusions with sufficient height is likely to increase the 0° peel strength described above. Namely, 0° peel strength is influenced by the number and the average height of protrusions with height not less than 0.5 μm. The lower limit of the number of the protrusions (per one side) is 3/cm², preferably 5/cm², and more preferably 10/cm². The upper limit of the number of the protrusions is 200/cm², and preferably 150/cm². The lower limit of the height of the protrusions is 0.5 μm, preferably 0.8 μm, and more preferably 1.0 μm. Size and height of the protrusions in the present invention are values measured by the measurement method described below.

The overview of the multi-layer polyolefin porous membrane and the battery separator of the present invention is described, but the scope of the invention is not naturally limited to these representative examples.

First, the multi-layer polyolefin porous membrane of the present invention is described. The multi-layer polyolefin porous membrane of the present invention is a multi-layer porous membrane comprising at least two or more layers.

The thickness of the multi-layer polyolefin porous membrane of the present invention is not more than 20 μm. The upper limit of the multi-layer polyolefin porous membrane thickness is preferably 16 μm and more preferably 12 μm. The lower limit of the multi-layer polyolefin porous membrane thickness is 7 μm and preferably 9 μm. When the thickness of the multi-layer polyolefin porous membrane is in the preferable ranges described above, practical membrane strength and pore blocking function can be achieved, the area in the unit volume of the battery case is not restricted and it is suitable for increase in battery capacity expected in the future.

The shut-down temperature of the multi-layer polyolefin microporous membrane is not less than 128° C. and less than 135° C., and more preferably less than 133° C., and even more preferably less than 130° C. If the shut-down temperature is less than 135° C., fine pores can be closed promptly due to heat in case of battery emergency, and the battery reaction can be terminated, hence higher battery safety.

The increase rate of air permeation resistance per 20 μm of the multi-layer polyolefin microporous membrane from 30° C. to 105° C. is not more than 1.5 sec/100 cc Air/° C., more preferably not more than 1.2 sec/100 cc Air/° C., and more preferably not more than 1.0 sec/100 cc Air/° C. If the increase rate of the air permeation resistance is not more than 1.5 sec/100 cc Air/° C., sufficient ion permeability can be maintained even if the heat is applied during the coating and manufacturing of a battery.

The upper limit of air permeation resistance of the multi-layer polyolefin porous membrane is 300 sec/100 cc Air, preferably 200 sec/100 cc Air, and more preferably 150 sec/100 cc Air. The lower limit of air permeation resistance of the multi-layer polyolefin porous membrane is 50 sec/100 cc Air, preferably 70 sec/100 cc Air, and more preferably 100 sec/100 cc Air.

For the porosity of the multi-layer polyolefin porous membrane, the upper limit is preferably 70%, more preferably 60% and even more preferably 55%. For the porosity of the multi-layer polyolefin porous membrane, the lower limit is preferably 30%, more preferably 35% and even more preferably 40%. When air permeation resistance and porosity are in the preferable ranges described above, sufficient battery charge/discharge characteristics, especially sufficient ion permeability (charge/discharge operating voltage) and life of a battery (closely related to the amount of an electrolytic solution to be retained) are achieved, functions as a battery may be sufficiently exhibited and sufficient mechanical strength and insulation may reduce the possibility of shorting during charge/discharge.

Since the average pore size in the multi-layer polyolefin porous membrane affects pore blocking characteristics greatly, it is preferably from 0.01 to 1.0 μm, more preferably from 0.05 to 0.5 μm, and even more preferably from 0.1 to 0.3 μm. When the average pore size in the multi-layer polyolefin porous membrane is in the preferable ranges described above, the sufficient 0° peel strength of the modified porous layer described above can be achieved due to the anchor effect of the functional resin, the air permeation resistance may not be significantly deteriorated upon laminating the modified porous layer, the response of the pore blocking phenomenon to the temperature may not slow down and pore blocking temperature associated with the rate of temperature increase may not shift to higher temperature.

For the polyolefin resin that configures the multi-layer polyolefin porous membrane, polyethylene and polypropylene are preferable. Additionally, the polyolefin resin can be a single component, a mixture of two or more kinds of different polyolefin resins, for example a mixture of polyethylene and polypropylene, or copolymer of different olefins. Among these, polyethylene is more preferable from the point of view of good pore blocking characteristics. They possess pore blocking effect that blocks electrical current and prevents excessive temperature increase upon abnormal temperature increase in batteries, in addition to basic properties such as electrical insulating properties, ion permeability and the like.

Details are discussed below with polyethylene as a polyolefin resin used in the present invention.

[1] Polyolefin Resin Composition for First Layer (Layer A)

A polyolefin microporous membrane which configures layer A of the present invention is polyolefin resin which comprises polyethylene as a major ingredient. In order to improve permeability and pin puncture strength, the content of polyethylene is preferably not less than 80 mass %, and more preferably not less than 90 mass %, based on 100 mass % of total amount of polyolefin resin, and even more preferably polyethylene is used alone.

Kinds of polyethylene include high density polyethylene, the density of which is more than 0.94 g/cm$^3$, moderate density polyethylene, the density of which is in a range of 0.93 to 0.94 g/cm$^3$, low density polyethylene, the density of which is less than 0.93 g/cm$^3$, liner low density polyethylene and the like. From the viewpoint of mechanical strength, the polyolefin resin composition preferably includes high density polyethylene and high molecular weight polyethylene. The high molecular weight polyethylene may be not only a homopolymer of ethylene, but also a copolymer that contains small amount of other α-olefins. Examples of α-olefin include propylene, 1-butene, 1-hexene, 1-pentene, 4-methyl-1-pentene, octene, vinyl acetate, methyl methacrylate, styrene and the like. For a multi-layer film, especially those manufactured by co-extrusion method, sometimes it may be difficult to control uniformity of physical properties in transverse direction due to viscosity differences among layers and the like. The use of high molecular weight polyethylene in the layer A can prevent inhomogeneous deformation because of greater degree of molecular network in the whole membrane, and can result in a microporous membrane with homogeneous physical properties.

Furthermore, if the content of high molecular weight polyethylene is within the preferable range, protrusions with sufficient height can be obtained. These protrusions function as anchors upon laminating a modified porous layer, resulting in exceptionally large peel resistance against a force applied parallel to the planar directions of the polyethylene porous membrane. Also, even when the polyethylene porous membrane thickness is reduced, sufficient tensile strength can be obtained. Preferably, tensile strength is not less than 100 MPa. The upper limit is not particularly defined.

The weight average molecular weight (Mw hereinafter) of the high density polyethylene is preferably not less than $1\times10^5$, and more preferably not less than $2\times10^5$. The upper limit of Mw of the high density polyethylene is preferably $8\times10^5$ and more preferably $7\times10^5$. Mw of the high density polyethylene within the ranges above can achieve both stability of the membrane formation and pin puncture strength obtained as a result. Meanwhile, Mw of the high molecular weight polyethylene is preferably not less than $1\times10^6$ and less than $4\times10^6$. The use of high molecular weight polyethylene with Mw not less than $1\times10^6$ and less than $4\times10^6$ can produce finer pores and fibrils and increase the pin puncture strength. If Mw of the high molecular weight polyethylene is not less than $4\times10^6$, it may cause troubles during membrane formation process, such as difficulty in extruding resin from a die due to excessively high viscosity of the melt composition. Also, if Mw of the high molecular weight polyethylene is not less than $4\times10^6$, it may produce a large difference in viscosity relative to that of layer B described below in the present invention, thereby may fail to coextrude individual layers homogeneously, especially in laminating by co-extrusion. The lower limit of the amount of the high molecular weight polyethylene is preferably 15 mass % and more preferably 18 mass %, based on 100 mass % of total of the polyolefin resin. The upper limit of the amount of the high molecular weight polyethylene is preferably 45 mass % and more preferably 40 mass %. The amount of the high molecular weight polyethylene within these ranges facilitates the balance between the pin puncture strength and air permeation resistance and can produce a microporous membrane with homogeneous air permeation resistance.

Meanwhile, addition of polypropylene to polyethylene can improve melt-down temperature when the polyolefin microporous membrane of the present invention is used as a battery separator. Kinds of polypropylene that can be used include block copolymer and random copolymer in addition to homopolymer. The block copolymer and the random copolymer can include copolymer ingredients with α-olefins other than propylene. For such α-olefin, ethylene is preferable. However, addition of polypropylene may reduce pin puncture strength compared to the polyolefin microporous membrane of polyethylene only. Therefore, the amount of polypropylene added is preferably from 0 to 20 mass % in the polyolefin resin.

The polyolefin microporous membrane layer A of the present invention practically does not include a low-melting point ingredient. The expression, "practically does not include a low-melting point ingredient" means that, for example, parts of an eluted component equal to or under 90° C. obtained by cross-fractionation chromatography is not more than 5.0 mass %, and preferably not more than 2.5 mass %. This is because it is difficult to remove low-molecular weight components, which may have a low melting point, to 0 mass %, due to the molecular weight distribution of polymers, even if the low-melting point ingredient is not added intentionally. If the low-melting point ingredient is present across all the layers, air permeation resistance may degrade upon heating even before shut-down.

For example, the elute components from cross-fractionation chromatography can be obtained as follows.

Measurement apparatus: cross-fractionation chromatography CFC-2 (Manufactured by Polymer Characterization, S.A.)

Detector: IR spectrophotometer IR4 (Manufactured by Polymer Characterization, S.A.)

Detection wavelength: 3.42 μm

Column: Shodex UT806M (Manufactured by Showa Denko K.K.)

Column temperature: 140° C.

Solvent (mobile phase): o-dichlorobenzene

Solvent flow rate: 1.0 mL/min

Sample concentration: 3.0 mg/mL

Temperature reduction time: 140 minutes (140° C.→0° C.)

The amount of elute components not more than 90° C.: By partitioning amounts of elution from 0° C. to 140° C. into sections for every 10° C., and dividing the sum of the amounts from 0° C. to 90° C. by the total amounts of the elution, the amount of elute components not more than 90° C. can be calculated.

[2] Polyolefin Resin Composition for Second Layer (Layer B)

A polyolefin microporous membrane which configures layer B of the present invention is polyethylene resin which comprises polyethylene as a major ingredient. From the viewpoint of mechanical strength, a kind of polyethylene is preferably high density polyethylene used as a major component. The weight average molecular weight (Mw hereinafter) of the high density polyethylene is preferably not less than $1\times10^5$, and more preferably not less than $2\times10^5$. The upper limit of Mw of the high density polyethylene is preferably $8\times10^5$ and more preferably $7\times10^5$. Mw of the high density polyethylene within the ranges above can achieve both stability of the membrane formation and pin puncture strength obtained as a result.

Also, in the present invention, it is important that a low-melting point ingredient such as low density polyethylene, liner low density polyethylene, and ethylene-α-olefin copolymer is added to the layer B. Addition of any of these ingredients can provide shut-down function at low temperature and improve characteristics of a battery separator. Examples of α-olefin include those described above. It is important that a melt flow rate (MFR) of the low-melting point ingredient is not less than 25 g/10 min. The lower limit of the melt flow rate of the low-melting point ingredient is preferably 50 g/10 min and more preferably 100 g/min. When MFR of the low-melting point ingredient is not less than 25 g/10 min, because of greater fluidity, the thickness inhomogeneity is less likely to develop during stretching process and homogeneous thickness distribution can be achieved. Also, when MFR of the low-melting point ingredient is not less than 25 g/10 min, because of greater molecular motility, residual strain is less likely to remain and the molecules are sufficiently relaxed at low temperatures, resulting in less likelihood of pore closure at temperatures lower than the melting point due to residual strain. Therefore, if MFR of the low-melting point ingredient is not less than 25 g/10 min, it is possible to prevent increase in permeability in a temperature range of 30° C. to 105° C. Additionally, if MFR of the low-melting point ingredient is not less than 25 g/10 min, because residual strain is less likely to remain, it is possible to reduce thermal shrinkage by the manufacturing method described below. The upper limit of MFR of the low-melting point ingredient is preferably 180 g/min and more preferably 150 g/min. If MFR of the low-melting point ingredient is not less than 180 g/min, viscosity of the melt is so low that each layer may not be extruded homogeneously during co-extrusion with the layer A. Also, if MFR of the low-melting point ingredient is not less than 180 g/min, the microporous membrane may break during the stretching process in manufacturing, because of low viscosity.

Furthermore, it is important that the melting point of the low-melting point ingredient is not less than 120° C. and less than 130° C. If the melting point of the low-melting point ingredient is less than 120° C., the pores may easily be closed and this may result in degraded air permeation resistance when the temperature is raised up to the temperature at which a multi-layer structure can be stretched sufficiently during the lamination with the layer A containing large molecular weight ingredients, because the melting point is too low. Meanwhile, if the temperature during the stretching as a whole is reduced to avoid pore closures, softening of the multi-layer structure as a whole becomes insufficient. Thereby, the effect of homogeneous thickness expected from addition of the large molecular weight ingredients in the layer A may not be achieved sufficiently. In addition, it may become necessary to reduce heatsetting temperature to prevent pore closure, and this may result in degraded thermal shrinkage. Meanwhile, if the melting point of the low-melting point ingredient is not less than 130° C., it may become difficult to achieve the shut-down temperature as low as the target.

The lower limit of the amount of the low-melting point ingredient is preferably 20 mass % and more preferably 25 mass %, based on 100 mass % of total of the polyolefin resin that configures the layer B. The upper limit of the amount of the low-melting point ingredient is preferably 35 mass % and more preferably 30 mass %. If the amount of the low-melting point ingredient is not less than 20 mass %, the shut-down temperature can be sufficiently low. Also, if the amount of the low-melting point ingredient is not more than 30 mass %, the breakage of the microporous membrane due to low viscosity can be prevented.

Meanwhile, it is preferable that the layer B includes high molecular weight polyethylene in the same manner as the layer A from the viewpoint of mechanical strength and formation of protrusions. The high molecular weight polyethylene may be not only a homopolymer of ethylene, but also a copolymer that contains small amount of other α-olefins. The addition of the high molecular weight polyethylene can improve the pin puncture strength. Mw of the high molecular weight polyethylene is preferably not less than $1\times10^6$ and less than $4\times10^6$. The use of high molecular weight polyethylene with Mw not less than $1\times10^6$ and less than $4\times10^6$ can produce finer pores and fibrils. Therefore, the pore closure by the low-melting point ingredient can occur promptly and the shut-down temperature can be lowered more effectively. The lower limit of the amount of the high molecular weight polyethylene is preferably 10 mass %, more preferably 18 mass %, and even more preferably 30 mass % based on 100 mass % of total of the polyolefin resin. The upper limit of the amount of the high molecular weight polyethylene is preferably 40 mass %. The high molecular weight polyethylene resin has molecular motility, which greatly differs from that of the low-melting point ingredient. Therefore, if the amount of the high molecular weight polyethylene is over 40 mass %, separation from the low-melting point ingredient tends to occur during melting and kneading process, and it may result in poor appearance of the microporous membrane as a final product.

For both the layer A and the layer B, the polyolefin microporous membrane of the present invention may include various additives such as an antioxidant, a heat stabilizer, an anti-static agent, and an ultra-violet absorbent, even a blocking retardant and fillers, as long as these additives do not degrade the effect of the present invention. Particularly, in order to prevent oxidation degradation of the polyethylene resin due to thermal history, it is preferable to add an antioxidant. The optional selection of kinds and amounts of an antioxidant and a heat stabilizer is important for adjustment or improvement of characteristics of the microporous membrane.

It is preferable that the polyolefin microporous membrane of the present invention does not practically include inorganic particles. The expression "not practically include inorganic particles" means that quantity of inorganic elements determined by X-ray fluorescence spectroscopy, for example, is not more than 50 ppm, preferably not more than 10 ppm, and more preferably not more than the detection limit. This is because contamination originated from foreign objects, or desquamation of contamination deposited on raw materials or processing line or apparatus in the polyolefin microporous membrane manufacturing processes may be present in the membranes or the layers, even if the particles are not included in the polyolefin microporous membrane intentionally.

Molecular weight distribution of the polyethylene resin of the B layer as well as that of the A layer, namely, the ratio of weight average molecular weight (Mw) to number-average molecular weight (Mn), (Mw/Mn), is preferably in the range of 5 to 200, and more preferably in the range of 10 to 100. The value of Mw/Mn within the preferable range described above facilitates extrusion of polyethylene solution and provides sufficient numbers of protrusions. Furthermore, it provides sufficient mechanical strength upon decreasing polyethylene porous membrane thickness. The value Mw/Mn is used as a measure of molecular weight distribution, and when this value is larger for polyethylene formed of a single component, the width of molecular weight distribution is larger. The value Mw/Mn of polyethylene formed of a single component can be adjusted as appropriate by multi-step polymerization of polyethylene. Meanwhile, the value Mw/Mn of a polyethylene mixture can be adjusted as appropriate by adjusting molecular weight or mixing ratio of each component.

Figure 2:
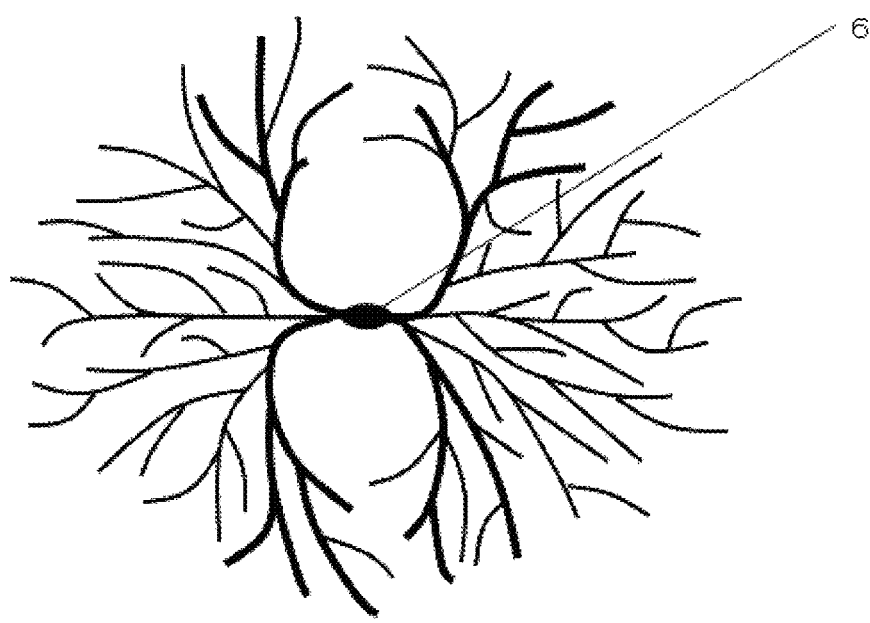
FIG. 2 is a schematic view illustrating a spherulite structure and a spherulite nucleus of polyethylene in the polyethylene porous membrane.
Figure 3:
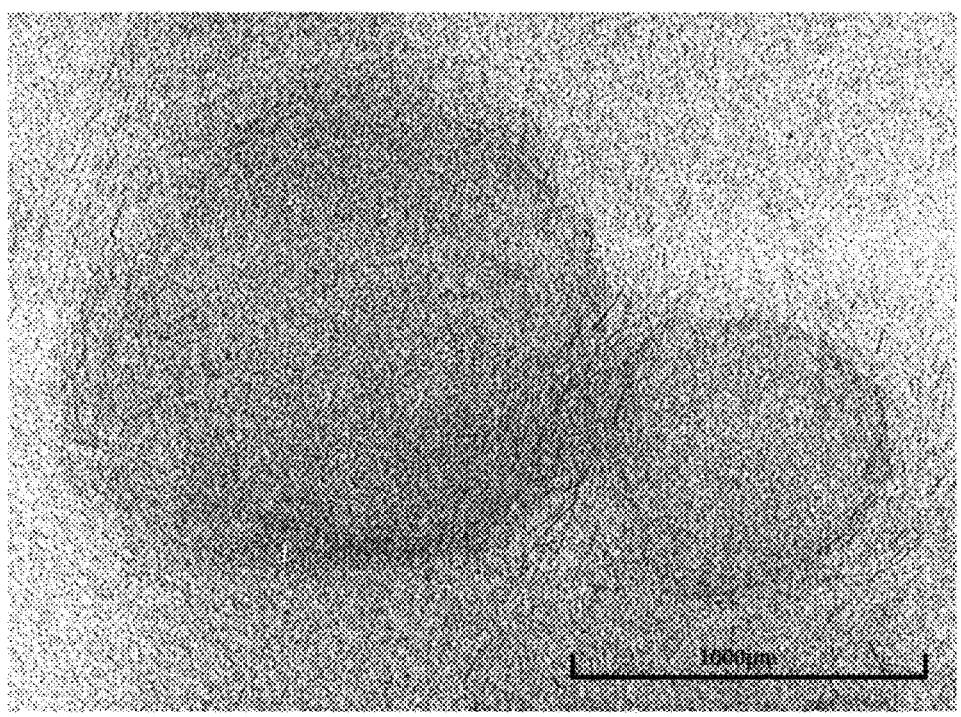
FIG. 3 is a micrograph of a ring-shaped mark on the polyethylene porous membrane, originating from the spherulite of polyethylene.

The inventors of the present invention consider the mechanism of protrusion formation as described in the present invention as follows. Crystallization of polyethylene begins simultaneously as extrusion of melt polyethylene resin and a forming solvent through the die, and the rate of crystallization increases due to rapid quenching caused by contact with the chill-roll. At this point, spherulites with symmetrical structure containing nuclei are formed (FIG. 2). If heat conduction rate between chill-roll surface and the melt polyethylene resin is relatively small, the rate of crystallization is small, resulting in spherulites containing relatively small nuclei. If heat conduction rate is large, spherulites containing relatively large nuclei are formed. These nuclei in the spherulites form protrusions during stretching in TD (transverse direction) and/or MD (machine direction) in the later process. Meanwhile, spherulites appear as a ring-shaped marks on polyethylene porous membrane surface (FIG. 3).

To manufacture a multi-layer polyethylene porous membrane, as long as the various characteristics described above are satisfied, any manufacturing method suitable for an objective can be selected optionally. Manufacturing methods of porous membranes include the foaming method, the phase-separation method, the melt-recrystallization method, the drawing-pore-opening method, the powder-sintering method and the like, and the phase-separation method is preferred among them from the viewpoints of homogenization of micropores and costs.

Examples of the manufacturing method according to the phase-separation method include a method comprising melting and kneading, for example, polyethylene with a forming solvent, extruding the resultant molten mixture through a die, cooling the extrudate to form a gel-like product, stretching the obtained gel-like product in one or more axes, and removing the forming solvent, to obtain a porous membrane.

[3] Manufacturing Method of the Multi-Layer Polyolefin Microporous Membrane

A method to manufacture the multi-layer polyolefin porous membrane of the present invention is described. A method to manufacture the multi-layer polyolefin porous membrane of the present invention comprises the steps of:

(a) preparing a polyolefin resin solution configuring a layer A by melting and kneading after adding a forming solvent to polyolefin resin;

(b) preparing a polyolefin resin solution configuring a layer B by melting and kneading after adding a forming solvent to polyolefin resin;

(c) extruding the polyethylene resin solutions A and B obtained in the steps (a) and (b) through a die, chilling at least one of the polyethylene resin solutions by a chill-roll having a surface, the forming solvent thereon being removed by a means to remove the forming solvent, and forming a multi-layer gel-like product;

(d) stretching the multi-layer gel-like product in MD (the machine direction) and in TD (the transverse direction) to obtain a multi-layer stretched and molded material;

(e) extracting and removing the forming solvent from the multi-layer stretched and molded material followed by drying, to obtain a multi-layer porous molded material; and (f) treating the multi-layer porous molded material by heat to obtain a multi-layer polyolefin porous membrane.

Furthermore, other steps such as hydrophilization treatment and discharging treatment can be added before, during or after the steps (a) to (f). Also, a re-stretching step can be implemented after the step (f).

Each step is described below using the example in which polyethylene resin is used as polyolefin resin.

(a), (b) Steps to prepare the polyethylene resin solutions A and B, in which a forming solvent is added to the polyethylene resin which configures the layer A and the layer B, followed by melting and kneading the mixture The forming solvent is not particularly limited, provided that it can dissolve polyethylene sufficiently. For example, aliphatic or cyclic hydrocarbon such as nonane, decane, undecane, dodecane, liquid paraffin and the like, or mineral oil fractions with their boiling points corresponding to these are included. A non-volatile solvent such as liquid paraffin is preferable to obtain a gel-like product with constant solvent content. Heat-melting is performed by stirring the polyethylene composition or homogeneously mixing polyethylene composition in the extruder at the temperature at which the polyethylene composition can be completely dissolved. Though the heating and melting temperature is dependent of polymer and solvent in case of stirring the polyethylene composition in the solvent or in the extruder, it is preferable in the range of 140 to 250° C., for example.

The concentration of the polyethylene resin is preferably from 15 to 40 parts by weight, more preferably from 25 to 40 parts by weight, and even more preferably from 28 to 35 parts by weight per 100 parts by weight of the total of the polyethylene resin and the forming solvent. If the polyethylene resin concentration is within the preferable range described above, sufficient number of the nuclei to form protrusions are formed, resulting in sufficient number of protrusions. Additionally, if the polyethylene resin concentration is within the preferable ranges described above, swell and neck-in phenomena at the outlet of the die can be suppressed as the polyethylene resin solution is extruded, and moldability and self-supporting characteristics of the extrudate are maintained.

The difference in resin concentrations between resin solution A and B can produce a multi-layer microporous membrane having a structure with variation in average pore size along the thickness direction (graded structure). The average pore size of the layer formed by the resin solution of lower concentration is larger than the average pore size of the layer formed by the resin solution of higher concentration. The selection between the resin solution A or B for the higher concentration can be made optionally depending on physical properties required for the multi-layer microporous membrane. The average pore size of 0.01 to 0.05 μm for an inner layer as a dense structure layer and the average pore size of 1.2 to 5.0 times that of the dense structure layer described above for an outer layer are preferable because balance between ion permeability and pin puncture strength is good.

The method of melting and kneading is not particularly limited, but normally homogeneous kneading is done in the extruder. This method is suitable for preparing the solution with high concentration of polyethylene. Melting and kneading temperature is dependent of polyolefin resin used. The lower limit thereof is preferably (the melting point of the polyolefin resin+10° C.) and is more preferably (the melting point of the polyolefin resin+20° C.). The upper limit of the melting and kneading temperature is preferably (the melting point of the polyolefin resin+120° C.) and is more preferably (the melting point of the polyolefin resin+100° C.). A melting point is a value measured by DSC according to JIS K7121 (1987) (the same applies hereinafter). For example, specifically, because the polyethylene composition has a melting point of about 130 to 140° C., the lower limit of the melting and kneading temperature is preferably 140° C., more preferably 160° C. and most preferably 170° C. The upper limit of the melting and kneading temperature is preferably 250° C., more preferably 230° C. and most preferably 200° C. Meanwhile, the melting and kneading temperature for the polyolefin solution containing polypropylene is preferably from 190 to 270° C. The forming solvent may be added before kneading or added during the kneading from the middle of the extruder and kneaded further. For melting and kneading, anti-oxidant is preferably added to prevent oxidation of the resin.

From the viewpoint of preventing resin degradation, the melting and kneading temperature is preferably low. However, if the melting and kneading temperature is lower than the temperatures described above, extrudate from the die may contain unmelted components, which may cause membrane puncture and the like in the stretching step later. If the melting and kneading temperature is higher than the temperatures described above, heat decomposition of polyolefin may become excessive, and the microporous membrane obtained may have inferior physical properties, such as pin puncture strength and tensile strength, for example.

A ratio of the length L and the diameter D of a screw of a biaxial extruder, L/D, is preferably from 20 to 100, from the viewpoint of better kneading processability and better resin dispersion and distributivity. The lower limit of the ratio, L/D, is preferably 35. The upper limit of the ratio, L/D, is preferably 70. The ratio, L/D, not less than 20 can achieve sufficient melting and kneading. The ratio, L/D, not more than 100 can suppress the excess residence time of polyolefin solution. An inner diameter of a cylinder of the biaxial extruder is preferably from 40 to 100 mm, from the viewpoint of preventing resin degradation during kneading and achieving better dispersion and distributivity.

In order to achieve good dispersion of polyethylene in the extrudate and to obtain excellent thickness homogeneity for the microporous membrane, a screw rotation rate Ns of the biaxial extruder is preferably not less than 150 rpm. Furthermore, a ratio of extrudate amount Q (kg/h) of the polyolefin solution to Ns (rpm), Q/Ns, is preferably not more than 0.64 kg/h/rpm. The ratio Q/Ns is more preferably not more than 0.35 kg/h/rpm.

(c) A step to extrude the polyethylene resin solutions A and B obtained in the steps (a) and (b) through a die, followed by chilling at least one of the polyethylene solutions by a chill-roll having a surface, the forming solvent thereon being removed by a means to remove the forming solvent, and to form a multi-layer gel-like product The polyolefin resin solutions A and B, which are melted and kneaded in the extruder, are extruded directly or through another extruder from a die, chilled on a chill-roll, to form a multi-layer gel-like product. Methods to obtain the multi-layer gel-like product include a bonding method, in which gel-like molded materials to be laminated are prepared separately and bonded together by passing them through calendar rolls and the like, a co-extrusion method, in which polyolefin solutions are supplied to the extruders separately, melted at a desired temperature, brought together by polymer tubes or in the die to be coextruded and laminated, thereby the multi-layer gel-like product can be obtained. From the viewpoint of inter-layer adhesion, the co-extrusion method is preferable.

The polyolefin resin solution extruded from the die is brought to contact with a rolling chill-roll. The surface of the chill-roll is controlled by the refrigerant to the temperature from 20° C. to 40° C. and the gel-like product is formed. The extruded polyethylene resin solution is preferably cooled down to the temperature not more than 25° C. The cooling rate in the temperature range that the crystallization practically occurs is important. For example, the polyethylene resin solution is cooled at the cooling rate not less than 10° C./sec. in the temperature range that the crystallization practically occurs, and the gel-like product is obtained. The cooling rate is preferably not less than 20° C./sec., more preferably not less than 30° C./sec., and even more preferably not less than 50° C./sec. The cooling step described above can immobilize microphase-separated structures in which a polyethylene phase is separated by solvent, form spherulites comprising relatively large nuclei on the surface of the gel-like product in contact with the chill-roll and form protrusions with appropriate shapes after stretching. The cooling rate can be estimated from the simulation using parameters such as extruding temperature of the gel-like product, thermal conductivity of the gel-like product, the thickness of the gel-like product, and heat transfer coefficients of the forming solvent, the chill-roll and air.

Figure 4:
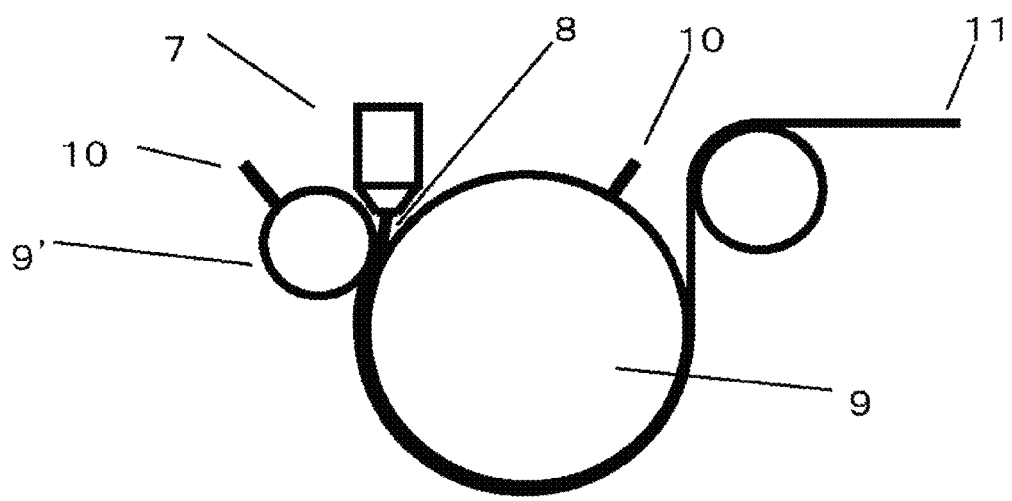
FIG. 4 is a schematic view of the steps to extrude polyethylene resin solution through a die disposed at the end of the extruder and to chill the extrudate by a chill-roll to form a gel-like product.

Additionally, in the present invention, it is important to remove a forming solvent deposited on the chill-roll surface, which will be in contact with the polyethylene resin solutions A and/or B extruded from the die, as much as possible. Namely, as illustrated in FIG. 4, the polyethylene resin solution is chilled and formed into the gel-like product upon contact with the rolling chill-roll and the forming solvent is present on the chill-roll surface after the formed gel-like product is removed. Generally, the roll surface as-is will be in contact with the polyethylene resin solution again. However, the large amount of the forming solvent deposited on the chill-roll surface has thermal insulation effect, which decelerates the cooling rate, and hinders the protrusion formation. Therefore, it is important to remove a forming solvent as much as possible before the chill-roll will be brought to contact with the polyethylene resin solution again.

The means to remove a forming solvent, namely, the means to remove the forming solvent from the chill-roll is not particularly limited. But the preferable means comprises placing a doctor blade on the chill-roll parallel to the transverse direction of the gel-like product and scraping off the forming solvent to the extent that the forming solvent may not be observable on the chill-roll surface from the point immediately after the doctor blade to the point of gel-like product contact. Alternatively, the forming solvent can be removed by the means comprising blowing off the forming solvent by compressed air, the means comprising pumping out the forming solvent, or the combination of these means. Among these means, the means using a doctor blade scraping off the forming solvent is preferable since it is relatively easily implemented, and the use of the two or more doctor blades instead of one is more preferred due to improvement in the effective removal of the forming solvent.

The material of the doctor blade is not particularly limited as long as it has resistance to a forming solvent. But the resin or rubber doctor blade is preferred compared to the metal doctor blade as a metal doctor blade may possibly damage the chill-roll. The resin doctor blades include polyester, polyacetal, polyethylene doctor blades and the like.

Even if the chill-roll temperature is set to less than 20° C., the insulating effect of the forming solvent may not only fail to achieve sufficient cooling rate, but also cause roughening of the surface of the gel-like product due to dew formation on the chill-roll.

The thickness of the polyethylene resin solution upon the extrusion is preferably not more than 1,500 μm, more preferably not more than 1,000 μm, and even more preferably not more than 800 μm. If the thickness of the polyethylene resin solution upon the extrusion is within the range described above, it is preferable since the cooling rate of the chill-roll surface is not decelerated.

If the multi-layer gel-like product is obtained by the bonding method, at least one of the polyolefin resin solutions for the layer A or the layer B is formed as a gel-like product under the cooling conditions described above. Meanwhile, for the bonding method, the side, which was in contact with the chill-roll, of the layer formed under the cooling condition described above is required to be the surface of the multi-layer gel-like product. Alternatively, if the multi-layer gel-like product is obtained by the co-extrusion method, the polyolefin resin solutions laminated together are coextruded from the die to form the multi-layer gel-like product under the cooling condition described above.

A configuration of the layers can be at least two layers of the layer A and the layer B, from the viewpoint of balance of physical properties such as shut-down characteristics, mechanical strength and permeability. However, from the viewpoint of balance between two sides of the final film, three-layer configuration, that is layer A/layer B/layer A or layer B/layer A/layer B, is preferred. From the viewpoint of adhesion to modified porous layers, protrusions can be formed either on the layer A or the layer B. From the viewpoint of balance between permeability and mechanical strength, it is preferable that the surface layers are the layer A and the inner layer is the layer B. Meanwhile, from the viewpoint of shut-down, it is preferable that the surface layers are the layer B and the inner layer is the layer A.

The ratio of the layer B is preferably not less than 30 mass % and not more than 80 mass % per a total mass of all the layers. The lower limit of the ratio of the layer B per a total mass of all the layers is preferably 40 mass % and the upper limit is preferably 70 mass %. The ratio of the layer B within the range described above can achieve low shut-down characteristics due to the low-melting point ingredient and the better balance between stability of the permeability in the separator usage range and pin puncture strength.

(d) A step to stretch the multi-layer gel-like product in MD (machine direction) and in TD (transverse direction) to obtain a stretched and molded material Next, the multi-layer gel-like product is stretched to form a stretched and molded material. The step of stretching involves heating of the gel-like product and stretching the gel-like product in MD and TD at the pre-determined magnifications using usual the tenter method, roll method or combination thereof. Stretching may be simultaneous stretching (simultaneous biaxial stretching) in MD and TD (machine direction and transverse direction) or may be sequential stretching. The order of the sequential stretching can be any of the ordering between MD and TD, and stretching in MD and/or TD can be multiple steps. Additionally, the magnification of the stretching is dependent of the thickness of the material, planar magnification is preferably not less than 9 and more preferably from 16 to 400. In case of simultaneous stretching in MD and TD (simultaneous biaxial stretching), the identical magnification for MD and TD, such as 3×3, 5×5 and 7×7, is preferred. The planar magnification within the preferable range described above provides sufficient stretching and results in the porous membrane with high modulus and large strength. Also, by controlling the stretching temperature, the desirable air permeation resistance can be obtained.

The stretching temperature is preferably not more than the melting point of the polyolefin resin as a low-melting point ingredient added to the layer B, and more preferably in a range of (the crystalline dispersion temperature Tcd of the polyolefin resin, which configures the layer A) to (the melting point of the low-melting point ingredient added to the layer B). If the stretching temperature is not more than the melting point of the low-melting point ingredient added to the layer B, pore cleavage defects due to melting of the low-melting point ingredient can be avoided, and molecular chains can be oriented efficiently by stretching, hence the better mechanical strength can be obtained. Furthermore, in the present invention, the thermal shrinkage can be reduced during the heatsetting step described below, but to maximize the effect of the heatsetting step, it is preferable that the upper limit of the stretching temperature is (the melting point of the low-melting point ingredient −5° C.). When the stretching temperature is not less than the crystalline dispersion temperature of the polyolefin resin which configures the layer A, softening of the polyolefin resin becomes sufficient in the layer A as well. Therefore, inhomogeneous deformation due to the insufficient softening can be suppressed, while the homogeneous pore opening due to molecular networks formed by the high molecular weight polyethylene added to the layer A is facilitated, thereby the better permeability as well as more homogeneous physical properties can be achieved. Meanwhile, because it is possible to lower the stretching tensile force applied to the whole multi-layer structure sufficiently, membrane formability becomes better and stretching can be done at high-magnification because occurrence of membrane punctures during the stretching is reduced. Because the polyethylene resin has a crystalline dispersion temperature of about 90 to 100° C., the longitudinal stretching temperature is preferably not less than 80° C. Because the melting point of the low-melting point ingredient of the present invention is not less than 120° C. and less than 130° C., the upper limit of the stretching temperature is less than 130° C. The crystalline dispersion temperature Tcd can be obtained by temperature dependence of dynamic visco-elasticity measurement according to ASTM D 4065. Also it can be obtained by NMR.

The stretching described above can create cleavages in higher-order structure formed in the gel-like sheet, refine crystalline phase and form a multiplicity of fibrils. The fibrils form a mesh structure with three-dimensional irregular linkages. The stretching improves the mechanical strength and expands the fine pores, which is suitable for a battery separator.

In the manufacturing of the microporous membrane of the present invention, a heatsetting step may be implemented in the stretching step. Heatsetting is preferably performed in a temperature range of (stretching temperature) to (the melting point of the low-melting point ingredient) after the stretching is completed at the predetermined magnification. Heatsetting at the high temperature not less than stretching temperature can achieve sufficient relaxation of molecular chains and reduce the thermal shrinkage. When the low-melting point ingredient is used, high heatsetting temperature may close the pores. However, because the melting point of the low-melting point ingredient of the present invention is not less than 120° C. and less than 130° C., the relatively high heatsetting temperature can be used. Also, because the low-melting point ingredient with high MFR, not less than 25 g/10 min, is used, the molecular motility of the low-melting point ingredient is higher compared to that of low-melting point ingredient with low MFR when heat is applied and relaxation is promoted. Thereby the thermal shrinkage can be lowered by heatsetting. Heatsetting under the state with plasticizer present can promote molecular motility even more by plasticizing effect, thereby heatsetting prior to extraction of the plasticizer is preferable.

(e) A step in which the forming solvent is extracted and removed from the multi-layer stretched and molded material and the multi-layer stretched and molded material is dried and the multi-layer porous molded material is obtained Next, the stretched and molded material is treated with washing solvent to remove residual forming solvent and the multi-layer porous membrane is obtained. The washing solvents that can be used are volatile solvents, and include hydrocarbons such as pentane, hexane, heptane and the like, chlorinated hydrocarbons such as methylene chloride, carbon tetrachloride and the like, fluorinated hydrocarbons such as trifluoroethane and the like, ethers such as diethylether, dioxane and the like. These washing solvents are appropriately selected according to the forming solvent used for dissolving polyethylene, and can be used alone or in combination thereof. The washing method includes immersion and extraction in the washing solvent, showering the washing solvent, suctioning the washing solvent from the opposite side of the stretched and molded material and the combination thereof. Washing described above is continued until the residual solvent in stretched and molded material reaches less than 1 wt. %. After the washing, the washing solvents are dried. The method of drying the washing solvents include heat drying, air-dry and the like.

(f) A step in which the multi-layer porous molded material is subjected to thermal treatment and the polyethylene porous membrane is obtained The multi-layer porous molded material obtained by drying further undergoes thermal treatment to produce multi-layer porous membrane. The thermal treatment temperature is preferable from 90 to 150° C. The thermal treatment temperature within the preferable range described above can achieve sufficient reduction in thermal shrinkage and air permeation resistance of the multi-layer polyolefin porous membrane obtained. The residence time of the thermal treatment step is not particularly limited, but generally is not less than 1 second and not more than 10 minutes, and preferably from 3 seconds to not more than 2 minutes. The thermal treatment can be done by any of the methods among the tenter method, roll method, pressing method, or free method.

Furthermore, it is preferable to shrink the porous molded material in at least one of MD (machine direction) and TD (transverse direction), while the porous molded material is fixed in both directions, MD and TD, in the thermal treatment step. If the shrinking of the porous molded material in MD and/or TD is not performed while the porous molded material is fixed in both directions, MD and TD, the thermal shrinkage of the porous molded material may be deteriorated. The ratio of shrinking the porous molded material in at least one of MD and TD, is from 0.01 to 50%, and preferably 3 to 20%. The ratio of shrinking within the preferable range described above improves the heat shrinkage after 8 hours at 105° C. and maintains air permeation resistance. Also, in order to improve pin puncture strength, re-stretching of about 5% to 20% in TD and/or MD may be performed before heatsetting treatment.

Furthermore, hydrophilization treatment can be optionally applied to the stretched and molded material, the porous molded material or the microporous membrane. By performing the hydrophilization treatment, for example, adhesion between the microporous membrane surface and a heat-resistant resin layer and homogeneity of coated membrane can be improved when the heat-resistant resin layer is coated. The hydrophilization treatment can be performed by monomer graft, surfactant treatment, corona discharge and the like. Monomer graft is preferably performed before the crosslinking treatment. Corona discharge treatment can be performed in air, nitrogen, or mixed atmosphere of nitrogen and carbon dioxide.

(1) Air Permeation Resistance

The upper limit of the air permeation resistance of the multi-layer polyolefin microporous membrane of the present invention is 300 sec/100 cc Air/20 μm and more preferably 250 sec/100 cc Air/20 μm, when the film thickness is 20 μm. The lower limit of the air permeation resistance is 50 sec/100 cc Air/20 μm, preferably 70 sec/100 cc Air/20 μm and more preferably 100 sec/100 cc Air/20 μm. If the air permeation resistance is not more than 300 sec/100 cc Air/20 μm, the multi-layer polyolefin microporous membrane exhibits better ion permeability and can maintain sufficient permeability to perform charge-discharge at higher rate even when the permeability is degraded during the coating of heat-resistant resin and the like on the microporous membrane. If the air permeation resistance is not less than 50 sec/100 cc Air/20 μm, the degradation of a battery can be prevented.

(2) Pin Puncture Strength

The pin puncture strength of the multi-layer polyolefin microporous membrane of the present invention is preferably not less than 4000 mN/14 more preferably 4200 mN/20 μm. When the pin puncture strength is not less than 4000 mN/20 μm, shorting of electrodes do not occur upon assembling a battery using the polyolefin microporous membrane as a separator, hence safety of the battery increases.

(3) Shut-Down Temperature

The shut-down temperature of the multi-layer polyolefin microporous membrane of the present invention is not less than 128° C. and less than 135° C., and more preferably less than 133° C., and even more preferably less than 130° C. If the shut-down temperature is less than 135° C., fine pores can be closed promptly due to heat in case of battery emergency, and the battery reaction can be terminated, hence higher battery safety increases.

(4) Increase Rate in Air Permeation Resistance

The increase rate of air permeation resistance per 20 μm of the multi-layer polyolefin microporous membrane of the present invention from 30° C. to 105° C. is not more than 1.5 sec/100 cc Air/° C., more preferably not more than 1.2 sec/100 cc Air/° C., and more preferably not more than 1.0 sec/100 cc Air/° C. If the increase rate of the air permeation resistance is not more than 1.5 sec/100 cc Air/° C., sufficient ion permeability can be maintained even if the heat is applied during the formation of the modified porous layers and manufacturing of a battery.

(5) Maximum Transverse Direction Shrinkage of the Multi-Layer Polyolefin Microporous Membrane Maximum transverse direction shrinkage of the multi-layer polyolefin microporous membrane of the present invention is 5.0%. The upper limit of the maximum transverse direction shrinkage of the multi-layer polyolefin microporous membrane is preferably 4.0% and more preferably 3.0%. If the maximum transverse direction shrinkage is not more than 5.0%, shorting is less likely to occur when a battery is heated up, because the separator shrinkage is low, hence battery safety increases. The maximum transverse direction shrinkage in the present invention is maximum shrinkage not more than 145° C., measured by the method described below.

(6) Thickness of the Multi-Layer Polyolefin Microporous Membrane

The upper limit of the thickness of the polyolefin microporous membrane of the present invention is preferably 20 μm. The upper limit of the thickness of the polyolefin microporous membrane is more preferably 18 μm, even more preferably 16 μm and most preferably 14 μm. The lower limit of the polyolefin microporous membrane is 5 μm and preferably 6 μm. The thickness in a range described above can maintain practical pin puncture strength while suitable for higher capacity of a battery in the future.

(7) Porosity

For the porosity of the polyolefin microporous membrane, the upper limit is preferably 70%, more preferably 60% and most preferably 55%. The lower limit of the porosity of the polyolefin microporous membrane is preferably 30%, more preferably 35% and most preferably 40%. If the porosity is not more than 70%, sufficient mechanical strength and insulation can be obtained and shorting is less likely to occur during charge-discharge. If the porosity is not less than 30%, better ion permeability and better battery charge-discharge characteristics can be obtained.

(8) Thickness Variation of the Multi-Layer Polyolefin Microporous Membrane

The upper limit of the thickness variation of the multi-layer polyolefin microporous membrane of the present invention is preferably 2.0%. The upper limit of the thickness variation of the multi-layer polyolefin microporous membrane is more preferably 1.5%. If the thickness variation is not more than 2.0, permeability inhomogeneity or coating inhomogeneity upon coating of the heat-resistant resin, for example, can be suppressed. The thickness variation is a value measured by the method described below.

The modified porous layer used in the present invention is described below.

A modified porous layer is preferably laminated on the side having protrusions of the multi-layer polyolefin porous membrane. When modified porous layers are disposed on the both sides, it is preferable that the side, on which the modified porous layer is laminated on the side having protrusions of the polyethylene porous membrane, is set to the side on which a larger amount of forces parallel to the modified porous layer surface is applied due to contact with rolls or bars during the later processes such as the slit process and transport process, since the effect of the present invention can be demonstrated effectively.

A modified porous layer described in the present invention is not particularly limited if the layer includes functionalized resin, namely, resin that provides or improves at least one of the functions among heat resistance, adhesion to an electrode material, wettability toward electrolytic solution and the like. The modified porous layers preferably include inorganic particles or cross-linked polymeric particles in addition to functionalized resin.

As functionalized resin, from the viewpoint of heat resistance improvement, for example, the heat-resistant resin used preferably has glass transition temperature or melting point not less than 150° C., more preferably not less than 180° C., and even more preferably not less than 210° C. It is not particularly necessary to specify the upper limits for glass transition temperature or melting point. If the glass transition temperature is higher than degradation temperature, the degradation temperature may be within the range described above. If the lower limit of the glass transition temperature is within the preferable range described above, sufficient heat-resistant membrane puncture temperature can be established and the great degree of safety is maintained.

As heat-resistant resin, for example, resin which comprises polyamideimide, polyimide or polyamide as a major ingredient can be used preferably. Among these, the resin comprising polyamideimide as a major ingredient is particularly preferred. These resin can be used alone or in combination with the other materials.

From the viewpoint of adhesion to electrodes, it is preferable to use one or more kinds of resin selected from the group consisting of vinylidene fluoride homopolymer, vinylidene fluoride/olefin fluoride copolymer, vinyl fluoride homopolymer and vinyl fluoride/olefin fluoride copolymer, as functionalized resin. Polytetrafluoroethylene is particularly preferred. These polymers can sustain sufficient affinity toward electrolytic solution during use at high temperature, since they have sufficient adhesion to electrodes, great affinity toward non-aqueous electrolytic solution, appropriate heat resistance and great chemical and physical stability toward non-aqueous electrolytic solution. Polyvinylidene fluoride (PVDF) is preferable.

The details of the functionalized resin are described below using polyamideimide resin as an example. In general, the synthesis of polyamideimide resin includes normal methods such as the acid chloride method, in which trimellitic chloride and diamine are used, the diisocyanate method, in which trimellitic anhydride and diisocyanate are used. The diisocyanate method is preferable from the viewpoint of manufacturing cost.

An acid component used for the synthesis of polyamideimide resin includes trimellitic anhydride (chloride) and some parts of the acid component may be substituted with the other polybasic acid or anhydride thereof. Examples include tetracarboxylic acids and anhydrides thereof such as pyromellitic acid, bipheny tetracarboxylic acid, biphenylsulphone tetracarboxylic acid, benzophenone tetracarboxylic acid, biphenylether tetracarboxylic acid, ethyleneglycol bis-trimellitate, propyleneglycol bis-trimellitate and the like, aliphatic dicarboxylic acids such as oxalic acid, adipic acid, malonic acid, sebacic acid, azelaic acid, dodecane dicarboxylic acid, dicarboxy polybutadiene, dicarboxy poly(acrylonitrile-butadiene), dicarboxy poly(styrene-butadiene) and the like, alicyclic dicarboxylic acids such as 1,4-cyclohexane dicarboxylic acid, 1,3-cyclohexane dicarboxylic acid, 4,4'-dicyclohexyl methane dicarboxylic acid, dimer acid and the like, aromatic dicarboxylic acids such as terephthalic acid, isophthalic acid, diphenylsulphone dicarboxylic acid, diphenyether dicarboxylic acid, naphthalene dicarboxylic acid and the like. Among these examples, 1,3-cyclohexane dicarboxylic acid and 1,4-cyclohexane dicarboxylic acid are preferable from the viewpoints of electrolytic solution resistance, and dimer acid, dicarboxy polybutadiene with molecular weight not less than 1,000, dicarboxy poly(acrylonitrile-butadiene) and dicarboxy poly(styrene-butadiene) are preferable from the viewpoint of shut-down characteristics.

Also, a urethane group may be introduced into the molecule by substituting the part of trimellitic acid compound with glycol. The glycol includes alkylene glycol such as ethylene glycol, propylene glycol, tetramethylene glycol, neopentyl glycol, hexandiol and the like, polyalkylene glycol such as polyethyleneglycol, polypropylene glycol, polytetramethylene glycol and the like, polyester with hydroxy terminal group synthesized from one or more than two kinds of dicarboxylic acids described above and one or more than two kinds of glycol described above and the like. Among these, polyethyleneglycol and polyester with hydroxy terminal group are preferred from the viewpoint of shut-down effect. In addition, number-average molecular weight of these is preferably not less than 500, and more preferably not less than 1,000. The upper limit of the number-average molecular weight is not particularly limited, but preferably it is less than 8000.

If a part of the acid component is substituted with at least one of the group consisting of dimer acid, polyalkylene ether, polyester, and butadiene-based rubber containing any one of carboxyl group, hydroxyl group and amino group at the terminal, it is preferable to substitute the amount from 1 to 60 mol % of the acid component.

A diamine (diisocyanate) component used for the synthesis of the polyamideimide resin preferably includes o-tolidine and tolylenediamine as the components, and a component that substitutes the part thereof includes aliphatic diamine such as ethylenediamine, propylenediamine and hexamethylenediamine and diisocyanates thereof, alicyclic diamine such as 1,4-cyclohexanediamine, 1,3-cyclohexanediamine and dicyclohexylmethanediamine and diisocyanates thereof, and aromatic diamine such as m-phenylenediamine, p-phenylenediamine, 4,4'-diaminodiphenyl methane, 4,4'-diaminodiphenyl ether, 4,4'-diaminodiphenyl sulfone, benzidine, xylylenediamine and naphthalene diamine and diisocyanates thereof, and among them, dicyclohexylmethanediamine and diisocyanate thereof are most preferable, and 4,4'-diaminodiphenyl methane, naphthalenediamine and diisocyanates thereof are preferable, from the viewpoints of reactivity, costs and electrolytic solution resistance. In particular, o-tolidine diisocyanate (TODI), 2,4-tolidine diisocyanate (TDI) and blends thereof are preferable. Furthermore, for improving 0° peel strength of the modified porous layer, the content of o-tolidine diisocyanate (TODI) that has high modulus is not less than 50 mol %, preferably not less than 60 mol %, and even more preferably not less than 70 mol %, based on the total amount of all isocyanates.

The polyamideimide resin can be easily produced by stirring in a polar solvent such as N,N'-dimethylformamide, N,N'-dimethylacetamide, N-methyl-2-pyrrolidone, or γ-butyrolactone while heating at from 60 to 200° C. In this case, amine such as triethylamine or diethylene triamine, or an alkali metal salt such as sodium fluoride, potassium fluoride, cesium fluoride or sodium methoxide can also be used optionally as a catalyst.

When the polyamideimide resin is used in the present invention, the logarithmic viscosity thereof is preferably not less than 0.5 dL/g. If the logarithmic viscosity of the polyamideimide resin is within the preferable range described above, the melt-down characteristics can be sufficiently achieved and the multi-layer polyolefin porous membrane can be prevented from becoming fragile. Also, 0° peel strength can be improved due to the anchor effect. Meanwhile, the upper limit of the logarithmic viscosity is preferably less than 2.0 dL/g, considering the processability and solubility toward solvents.

The modified porous layer of the present invention can be obtained by coating a resin solution (referred to as varnish in some cases, hereafter) dissolved in a solvent, which can dissolve functionalized resin and miscible with water, on a predetermined substrate, phase-separating the functionalized resin and the solvent under the humidified condition, and solidifying the resin under water bath (referred to as a coagulating bath in some cases, hereafter). A phase-separation assisting agent can be added to varnish optionally.

Solvents to dissolve the functionalized resin include N,N-dimethyl acetamide (DMAc), N-methyl-2-pyrrolidone (NMP), hexamethylphosphoric triamide (HMPA), N,N-dimethylformamide (DMF), dimethyl sulfoxide (DMSO), γ-butyrolactone, chloroform, tetrachloroethane, dichloroethane, 3-chloro naphthalene, parachlorophenol, tetralin, acetone, acetonitrile and the like, and it can be selected according to the solubility of the resin without restriction.

Solid concentration of the varnish is not particularly limited as long as it can be coated uniformly, but it is preferably not less than 50 wt. % and not more than 98 wt. % and more preferably not less than 80 wt. % and not more than 95 wt. %. The solid concentration of the varnish within the preferable range described above can prevent the modified porous layer from becoming fragile and achieve sufficient 0° peel strength of the modified porous layer.

Phase-separation assisting agents used in the present invention is one or more kinds of agents selected from water, alkylene glycol such as ethylene glycol, propylene glycol, tetramethylene glycol, neopentyl glycol, hexandiol and the like, polyalkylene glycol such as polyethylene glycol, polypropylene glycol, polytetramethylene glycol and the like, water soluble polyester, water soluble polyurethane, polyvinylalcohol, carboxymethylcellulose and the like.

The amount of phase-separation assisting agent added is preferably from 10 to 90 wt. %, more preferably from 20 to 80 wt. % and even more preferably from 30 to 70 wt. % based on the weight of the varnish solution. Mixing these phase-separation assisting agents to the varnish can mainly control the air permeation resistance, the surface open porosity and the rate of layer structure formation. If the amount added is within the preferable range described above, the rate of phase separation is significantly increased. In addition, it will prevent the resin solution from becoming turbid and resin component from deposited during mixing.

In order to reduce the curl of the multi-layer polyolefin porous membrane caused by laminating the modified porous layer, it is important to add inorganic particles or cross-linked polymeric particles to the varnish. Addition of inorganic particles or cross-linked polymeric particles to the varnish can prevent internal shorting caused by growth of dendrite crystals of the electrodes inside the battery (anti-dendrite formation effect), reduce the thermal shrinkage and provide lubrication. The upper limit for the amount of the particles added is preferably 98 wt. % and more preferably 95 wt. %. The lower limit for the amount of the particles added is preferably 80 wt. %, and more preferably 85 wt. %. When the amount of the particle added is within the preferable range described above, the reduction of the curl is sufficient, the ratio of the functionalized resin based on the total volume of the modified porous layer is the most suitable and sufficient 0° peel strength of the modified porous layer can be obtained.

Examples of inorganic particles include calcium carbonate, calcium phosphate, amorphous silica, crystalline glass fillers, kaolin, talc, titanium dioxide, alumina, silica-alumina conjugate oxide particles, barium sulfate, calcium fluoride, lithium fluoride, zeolite, molybdenum sulphide, mica and the like. Examples of heat-resistant cross-linked polymeric particles include cross-linked polystyrene particles, cross-linked acrylate-based resin particles, cross-linked methyl-methacrylate based particles and the like.

The average size of these particles is preferably not less than 1.5 times and not more than 50 times as large as the average pore size of the multi-layer polyolefin porous membrane. The average size of the particles is more preferably not less than 2.0 times and not more than 20 times as large as the average pore size of the multi-layer polyolefin porous membrane. When the average size of the particles is within the preferable range described above, the pores in the multi-layer polyolefin porous membrane may be blocked while the heat-resistant resin and the particles coexist, and air permeation resistance can be maintained as a result. Meanwhile, it can prevent shedding of particles during the battery assembly process, which may cause serious failure of the battery.

The shape of the particles includes spherical shape, substantially spherical shape, plate shape, needle shape, or polyhedron shape. But it is not particularly limited.

The thickness of the modified porous layer is from 1 to 5 μm, preferably from 1 to 4 μm and more preferably from 1 to 3 μm. When the thickness of the modified porous layer is within the preferable range described above, a battery separator obtained by laminating the modified porous layer can maintain membrane puncture resistance and electrical insulation in the event of melting/shrinking at the melting point or the higher temperature and prevent abnormal reaction by having sufficient pore blocking function. In addition, the volume upon winding can be reduced, thus being suitable for battery capacity increase. Furthermore, the reduction in the curl can improve productivity in the battery assembly process.

The porosity of the modified porous layer is preferably from 30 to 90%, and more preferably from 40 to 70%. If the porosity of the modified porous layer is within the preferable range described above, a battery separator obtained by laminating the modified porous layer has low electrical resistance and exhibits increase in electrical current. Also the membrane strength can be maintained.

The upper limit for the total thickness of the battery separator obtained by laminating the modified porous layer is preferably 25 μm, and more preferably 20 μm. The lower limit of the thickness of the whole battery separator is preferably not less than 6 μm and more preferably not less than 7 μm. When the thickness of the whole battery separator is within the preferable range described above, the battery separator obtained by laminating the modified porous layer can achieve sufficient mechanical strength and electrical insulation. In addition, capacity reduction can be avoided since the electrode areas filling the battery can be reduced.

The air permeation resistance of the battery separator is one of the most important characteristics and preferably ranges from 50 to 600 sec/100 cc Air, more preferably from 100 to 500 sec/100 cc Air, and even more preferably from 100 to 400 sec/100 cc Air. When the air permeation resistance of the battery separator is within the preferable range described above, sufficient electrical insulation can be achieved and clogging, shorting and membrane puncture can be avoided. In addition, reduction in the membrane electrical resistance can achieve charge-discharge characteristics and battery life characteristics within the range of practical use.

The method of laminating the modified porous layer of the battery separator of the present invention is described below. The method of laminating the modified porous layer on the multi-layer polyolefin porous membrane may be a method, in which the varnish is directly coated onto the multi-layer polyolefin porous membrane and converted to the modified porous layer (the direct method), or a method, in which the varnish is coated on a substrate film (e.g. polypropylene film or polyester film), phase-separated for the functional resin component and the solvent component and converted to the modified porous layer under the specified humidified environment, followed by transfer to the multi-layer polyolefin porous membrane to produce the laminate (the transfer method).

In the present invention, the preferable method for laminating the modified porous layer comprises the steps (i) and (ii) in the manufacturing steps. Step (i): a step to form a functionalized resin layer on the multi-layer polyolefin porous membrane, in which coating the varnish containing the functionalized resin and the inorganic particles or the cross-linked polymeric particles on the multi-layer polyolefin porous membrane is followed by passing it through a low-humidity zone (absolute humidity is not less than 0.5 g/m$^3$ and less than 6 g/m$^3$) and a high-humidity zone (absolute humidity is not less than 7.0 g/m$^3$ and less than 25.0 g/m$^3$). Step (ii): a step to produce a battery separator, in which the composite membrane laminated with the functionalized resin layer obtained in the step (i) is immersed in a coagulating bath so that the functionalized resin layer is converted to a modified porous layer, followed by washing and drying.

The further details are described below. The varnish comprising the functionalized resin solution, in which the functionalized resin is dissolved in the solvent capable of dissolving the functionalized resin and miscible with water, and inorganic particles or cross-linked polymeric particles as major ingredients, is coated on the multi-layer polyolefin porous membrane. Then, the varnish-coated multi-layer polyolefin porous membrane is placed under the specific humidified environment, and the varnish is phase-separated. Then, the functionalized resin is solidified in the water bath (coagulating bath) and the modified porous layer is obtained.

The low-humidity zone in the present invention is the zone controlled to the absolute humidity less than 6 g/m$^3$, with the preferable upper limit of 4 g/m$^3$, the more preferable upper limit of 3 g/m$^3$, with the preferable lower limit of 0.5 g/m$^3$, and the more preferable lower limit of 0.8 g/m$^3$. When the absolute humidity is within the preferable range described above, the phase-separation is sufficiently achieved to become porous and the increase in air permeation resistance is reduced. In addition, along with phase-separation, the solidification of the resin configuring the modified porous layer is suppressed, penetration of the resin component configuring the modified porous layer into the multi-layer polyolefin porous membrane can be achieved sufficiently. As a result, the sufficient 0° peel strength of the modified porous layers can be obtained. Also, when the time required for passing through the low-humidity zone is less than 3 seconds, the phase separation described above is not sufficiently progressed. When the time required for passing through the low-humidity zone is more than 20 seconds, solidification of the resin configuring the modified porous layer is unpreferably progressed.

Next, the coated membrane is passed through the high-humidity zone for not less than 3 seconds but not more than 10 seconds. The high-humidity zone in the present invention is the zone controlled to the absolute humidity with the lower limit of 6 g/m$^3$, the preferable lower limit of 7 g/m$^3$ and the more preferable lower limit of 8 g/m$^3$, while with the upper limit of 25 g/m$^3$, the preferable upper limit of 17 g/m$^3$, and with the more preferable upper limit of 15 g/m$^3$. When the absolute humidity is within the preferable range described above, gelation (immobilization) can be sufficiently achieved, excessive penetration of the resin component configuring the modified porous layer into the multi-layer polyolefin porous membrane may not occur, and the increase in the air permeation resistance can be reduced. Meanwhile, excessive solidification of the resin component and excessive reduction in penetration of the functionalized resin component into the multi-layer polyolefin porous membrane can be prevented and sufficient 0° peel strength can be obtained. Though the temperature condition is not particularly limited, as long as the absolute humidity is within the range described above for both the low-humidity zone and the high-humidity zone, it is preferable not less than 20° C., and not more than 50° C. from the viewpoint of energy savings.

Examples of the method of coating the varnish include a reverse roll coating method, a gravure coating method, a kiss coating method, a roll brush method, a spray coating method, an air knife coating method, a meyer-bar coating method, a pipe doctor method, a blade coating method and a die coating method, and these methods can be used alone or in combination thereof.

In the coagulating bath, the resin component and the particles are solidified in a three-dimensional mesh-like pattern. The time duration for immersing in the coagulating bath is preferably not less than 3 seconds. When the time duration for immersing in the coagulating bath is within the preferable range described above, the sufficient solidification of the resin component can be achieved. The upper limit of the time duration for immersing in the coagulating bath is not particularly limited, but 10 seconds may be sufficient.

Furthermore, the porous membrane prior to the washing is immersed in the aqueous solution containing the solvent suitable for the functionalized resin in the amount from 1 to 20 wt. %, preferably from 5 to 15 wt. %, subsequently followed by the washing process using pure water and drying process using hot air of temperature not more than 100° C., and the final battery separator can be obtained.

For washing, general methods such as warming, ultrasonic irradiation or bubbling can be used. Furthermore, to maintain the concentration of each bath constant and improve washing efficiency, a method of removing a solution inside the porous membrane between baths is effective. Specific examples thereof include a method of forcing out a solution within a porous layer by air or an inert gas and a method of physically squeezing out a solution within a membrane by a guide roll.

It is desirable to store the battery separator of the present invention in a dry state. However, if storage in an absolute dry state is difficult, the battery separator is preferably subjected to a vacuum drying treatment at the temperature not more than 100° C. just before use.

The battery separator of the present invention can be used in nickel-metal hydride batteries, nickel-cadmium batteries, nickel-zinc batteries, silver-zinc batteries, rechargeable batteries such as lithium rechargeable batteries, lithium polymer rechargeable batteries and the like, plastic film capacitors, ceramic capacitors, electric double layer capacitors and the like as a separator, but is preferably used as a separator for lithium ion rechargeable batteries. The use of a lithium ion rechargeable battery as a separator is described below as an example.

In lithium ion rechargeable batteries, a positive electrode and a negative electrode are laminated with a separator interposed therebetween, and the separator contains an electrolytic solution (an electrolyte). The structure of the electrode is not particularly limited, and can be a known structure. For example, an electrode structure in which disc-shaped positive electrode and negative electrode are placed to face each other (coin type), an electrode structure in which planar positive electrodes and negative electrodes are alternately laminated (lamination type), an electrode structure in which band-shaped positive electrode and negative electrode are overlapped and wound (winding type) and the like can be employed.

The positive electrode normally comprises a current collector and a positive-electrode active material layer formed on the surface of the current collector and containing a positive-electrode active material capable of absorbing and desorbing lithium ions. Examples of the positive-electrode active material include inorganic compounds such as a transition metal oxide, a composite oxide of lithium and a transition metal (lithium composite oxide), a transition metal sulfide and the like. Examples of the transition metal include V, Mn, Fe, Co, Ni and the like. Preferred examples of the lithium composite oxide among the positive-electrode active materials include lithium nickel oxide, lithium cobalt oxide, lithium manganese oxide, a lamellar lithium composite oxide having an $\alpha$-$NaFeO_2$-type structure as matrix and the like.

The negative electrode includes a current collector and a negative-electrode active material layer formed on the surface of the current collector and containing a negative-electrode active material. Examples of the negative-electrode active material include carbonaceous materials such as natural graphite, artificial graphite, cokes, carbon black and the like. An electrolytic solution is obtained by dissolving a lithium salt in an organic solvent. Examples of the lithium salts include $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, $LiN(C_2F_5SO_2)_2$, $LiPF_4(CF_3)_2$, $LiPF_3(C_2F_5)_3$, a lithium salt of a lower aliphatic carboxylic acid, $LiAlCl_4$ and the like. These can be used alone or in combination of two or more kinds thereof. Examples of the organic solvent include an organic solvent having a high boiling point and a high dielectric constant such as ethylene carbonate, propylene carbonate, ethylmethyl carbonate, $\gamma$-butyrolactone and the like, and an organic solvent having a low boiling point and a low viscosity such as tetrahydrofuran, 2-methyltetrahydrofuran, dimethoxyethane, dioxolane, dimethyl carbonate, diethyl carbonate and the like. These can be used alone or in combination of two or more kinds thereof. Particularly, since an organic solvent having a high dielectric constant has a high viscosity, and an organic solvent having a low viscosity has a low dielectric constant, a mixture of each type of an organic solvent is preferably used.

Upon assembling a battery, the separator of the present invention can be impregnated with an electrolytic solution to provide the separator with ion permeability. Usually, an impregnation treatment is carried out by immersing a microporous membrane in an electrolytic solution at normal temperature. For example, when a cylindrical battery is assembled, first a positive electrode sheet, a separator (composite porous membrane), and a negative electrode sheet are laminated in this order, and the laminate is wound up from one end to form a winding-type electrode element. Then, this electrode element is inserted into a battery can, and impregnated with the electrolyte solution described above, followed by caulking a battery cap having a safety valve and serving as a positive electrode terminal via a gasket. Thereby a battery can be obtained.

WORKING EXAMPLES

The present invention is described below using examples. However, the present invention is not limited by these examples in any way. Meanwhile, the measurement values in the working examples are the values measured by the methods described below.

1. Number of Protrusions

The numbers and sizes of the protrusions were measured using a confocal microscope (HD100, manufactured by Lasertec Corporation), placed on a vibration isolation platform, after the light source thereof was stabilized.

Steps (1) On the surface of the polyethylene porous membrane obtained by working examples or comparative examples, the surface being the one with in contact with the chill-roll during the manufacturing, a square frame of 1 cm×1 cm in size was drawn with a fine-point permanent marker.

(2) The sample was placed on the sample stage with the surface with the drawn square up, and was fixed firmly to the sample stage using the electrostatic adhesion apparatus, the accessory of the confocal microscope.

(3) Using the objective lens with magnification of 5 times, a ring-shaped mark originating from a polyethylene spherulite as in FIG. 3 was displayed on the monitor as a two-dimensional image (called REAL screen for this microscope), and the position of the sample stage was adjusted so that the darkest part of the ring-shaped mark was approximately at the center of the monitor screen. When two ring-shaped marks were connected, the stage was adjusted so that a point of contact was at the center of the monitor screen. The protrusion height was measured only for the ring-shaped mark originating from the polyethylene spherulite with its major axes not less than 0.2 mm. The major axis length of a ring-shaped mark was measured by reading the length between two ends of the ring-shaped mark using a cursor on the two-dimensional image described above.

(4) Changing the objective lens to the one with magnification of 20 times, the reference height (called REF SET in this microscope) was set to the height when the focus was adjusted to the center area of the monitor screen (so that the center area of the monitor screen was displayed most brightly in this microscope).

(5) The measurement range in the height direction was set to 15 μm up and down relative to the reference height as 0 μm described above. Also, the scan time was 120 seconds, STEP transport distance was 0.1 μm/Step and the three-dimensional data was acquired.

(6) After the acquisition of the three-dimensional data, the image for data processing (Z image in this microscope) was displayed and smoothing process was applied (the conditions for smoothing are: the size of filter: 3×3, matrix type: SMOOTH3-0, the number of process: 1). In addition, plane correction was applied optionally in the plane correction window as necessary.

(7) The cursor was positioned horizontally on the position intersecting the highest protrusion in the image for data processing (the brightest position) and the cross-sectional profile corresponding to the cursor was displayed on the cross-sectional profile image.

(8) The protrusion size was measured by positioning the two vertical cursors to the inflection points at each side of the skirt of the protrusion in the cross-sectional profile image, and was defined as the distance between the two cursors.

(9) The protrusion height was measured by positioning the two horizontal cursors to the peak of the protrusion and the inflection points at each side of the skirt of the protrusion (the lower inflection point if the two inflection points at each side of the skirt of the protrusion were different in height), and was defined as the distance between two cursors.

(10) The operation described above was repeated inside the square of 1 cm×1 cm described above, the protrusions with size not less than 5 μm and not more than 50 μm, and with height not less than 0.5 μm and not more than 3.0 μm, were counted. Thus the number of the protrusions per 1 $cm^2$ was obtained and the average height of the protrusions was obtained.

2. 0° Peel Strength of Modified Porous Layer

FIG. 1 schematically illustrates the evaluation method. Reference numeral 1 denotes a laminated sample, 2 denotes a multi-layer polyolefin porous membrane, 3 denotes a modified porous layer, 4 denotes a double-sided adhesive tape, 5 and 5' denote aluminum plates, and the arrow in the figure indicates the direction of tensile force. On the aluminum plate 5, which was 50 mm×25 mm in size and 0.5 mm in thickness, a piece of double-sided tape 4 (NW-K50, manufactured by Nichiban) of the same size thereof was adhered. The surface of the multi-layer polyolefin porous membrane 2 of the sample 1 (the battery separator), cut out in the size of 50 mm in width and 100 mm in length, was adhered on the aluminum plate 5 above, so that the 40 mm portion of the sample, measured from one of the 25 mm long edges of the aluminum plate 5, was overlapped and adhered together, while the protruded portion was cut out. Next, a double-sided adhesive tape was adhered on one side of the aluminum plate 5', 100 mm in length, 15 mm in width and 0.5 mm in thickness. And the 20 mm portion of the sample, measured from one of the 25 mm long edges of the aluminum plate 5, was overlapped and adhered together. Then, the aluminum plate 5 and the aluminum plate 5', which interposed the sample, were attached to the tensile tester (Autograph AGS-J1kN, manufactured by Shimadzu Corp.), and the load was applied on the aluminum plate 5 and the aluminum plate 5' in parallel but in opposite directions, at a tensile velocity of 10 mm/min, and the strength at which the modified porous layer was delaminated was measured. The measurement was performed for any three points separated not less than 30 cm from each other in the longitudinal direction, and the average value thereof was recorded as the 0° peel strength of the modified porous layer.

3. Membrane Thickness and Thickness Variation

The membrane thickness (μm) was obtained by averaging 20 measurements made at an interval of 1 cm in MD using a contact-type membrane thickness meter (Litematic Series 318, manufactured by Mutsutoyo). An ultrahard spherical contact point of φ9.5 mm was used and measurements were done at 0.01 N measuring force. The thickness variation (%) was obtained by deviation of the membrane thickness calculated from the 20 measurements divided by the thickness, and expressed in percentage.

4. Average Pore Size of Surface Layer

The average pore size of the surface layer of the multi-layer polyolefin porous membrane was measured by the methods below. A sample was fixed on a measuring cell using a double-sided adhesive tape, on which platinum or gold was vacuum-deposited for several minutes, and the SEM measurement was conducted for the surface of the membrane under appropriate magnification. Any 10 points in an image obtained in the SEM measurement were selected, an average value of pore diameters at the 10 points was determined as an average pore size of the sample.

5. Air Permeation Resistance

Using Gurley Type Densometer Model B manufactured by TESTER SANGYO CO., LTD, the multi-layer polyolefin porous membrane or the battery separator, which was fixed between a clamping plate and an adapter plate so that no winkle occurred, was measured in accordance with JIS P8117. A10 cm-square sample was used, the measurement was performed for total of 5 points as measurement points, including the center and four corners of the sample. An average value of 5 points was used as air permeation resistance [sec/100 cc Air]. In the case where the length of one side of the sample was less than 10 cm, a value obtained by the measurement for 5 points at intervals of 5 cm may be used. The air permeation resistance scaled to 20 μm thickness was obtained by the following formula using average membrane thickness T1 (μm) and the air permeation resistance obtained.

(air permeation resistance scaled to 20 μm thickness)
=air permeation resistance [sec/100 cc Air]×20 [μm]/T1 [μm]

The increase in the air permeation resistance was obtained by the following formula.

The increase in the air permeation resistance=(Y)−(X) sec/100 cc Air

The air permeation resistance of the multi-layer polyolefin porous membrane (X) sec/100 cc Air
The air permeation resistance of the battery separator (Y) sec/100 cc Air 6. Shut-Down Temperature Air permeation resistance of the multi-layer polyolefin microporous membrane was measured by Oken type Air-permeability Tester (EGO-1T, manufactured by Asahi Seiko Co., Ltd) while the multi-layer polyolefin microporous membrane was heated at the rate of temperature increase of 5° C./min. The temperature at which the air permeation resistance reached the detection limit, $1 \times 10^5$ sec/100 cc Air, was determined as a shut-down temperature (° C.).

7. Increase Rate in Air Permeation Resistance

From the data of temperature and air permeation resistance P of the multi-layer polyolefin microporous membrane with the thickness T1 (μm) obtained from the shut-down temperature measurement of (4), a correlation chart between temperature and air permeation resistance P for the temperature range of 30° C. to 105° C. was made. From the chart, a slope Pa (sec/100 cc Air/° C.) was calculated using least-squares method. The calculated Pa was normalized for the membrane thickness of 20 μm, using the formula: Pb=Pa/T1×20. Thereby the increase rate Pb (sec/100 cc Air/μm/° C.) of the air permeation resistance in the temperature range of 30° C. to 105° C. was obtained.

8. Maximum Transverse Direction Shrinkage

A 3 mm-width strip-shaped sample of the microporous membrane, which was cut out longitudinally along the transverse direction of the microporous membrane, was set on a thermomechanical analyzer (TMA/SS6000, manufactured by Seiko Instruments Inc.) with a chuck distance of 10 mm. While the sample, under the load of 2 gf at the lower end thereof, was heated from room temperature to 145° C. at the heating rate of 5° C./min, the dimensional change in the sample in the transverse direction was measured. The maximum of the dimensional change rate at 145° C. or less was defined as the maximum shrinkage immediately before the melting.

9. Pin Puncture Strength

A maximum load was measured when an 1-mm diameter needle with a spherical tip (a radius of curvature R: 0.5 mm) was pierced into the microporous membrane of the average membrane thickness T1 (μm), at the piercing velocity of 2 mm/sec. The measured maximum load La was converted to the maximum load Lb scaled to 20 μm membrane thickness by the formula: Lb=(La×20)/T1 and the pin puncture strength (gf/20 μm) was obtained.

10. Weight Average Molecular Weight (Mw) and Molecular Weight Distribution (Mw/Mn)

Mw and Mw/Mn were determined by gel permeation chromatography (GPC) under the following measurement conditions.

Measurement apparatus: GPC-150C, manufactured by Waters Corporation
Column: Shodex UT806M, manufactured by Showa Denko, K.K.
Column temperature: 135° C.
Solvent (mobile phase): o-dichlorobenzene
Solvent flow rate: 1.0 mL/min
Sample Concentration: 0.1 mass % (dissolution condition: 135° C./1 h)
Injection quantity: 500
Detector: differential refractometer manufactured by Waters Corporation.
Calibration curve: Created using pre-determined conversion constant from calibration curve obtained using monodisperse polystyrene standard sample.

11. Melt Flow Rate (MFR)

The measurement was done according to JIS-K7210, under the temperature of 190° C. and the load of 2.16 g.

12. Logarithmic Viscosity

A solution obtained by dissolving 0.5 g of heat-resistant resin in 100 mL of NMP was measured at 25° C. using an Ubbelohde viscometer.

13. Melting Point

Using the differential scanning calorimetry (DSC), DSC6220 manufactured by SII NanoTechnology Corp., a resin sample of 5 mg was subjected to the temperature increase at the rate of temperature increase of 20° C./min under nitrogen atmosphere, and an apex of the melting peak observed during the temperature increase was determined as a melting point.

14. Glass Transition Temperature

A resin solution or a resin solution obtained by dissolving only a modified porous layer by immersing a battery separator in a good solvent was applied onto a PET film (E5001 manufactured by Toyobo Co., Ltd.) or a polypropylene film (Pyrene-OT (registered trademark) manufactured by Toyobo Co., Ltd.) using an applicator with an appropriate gap. A film obtained was peeled off after pre-drying at 120° C. for 10 minutes, then fixed in a metal frame having an appropriate size with a heat-resistant adhesive tape, and further dried in vacuum at 200° C. for 12 hours. The dried film was obtained. A sample having a width of 4 mm and a length of 21 mm was cut out from the dried film obtained, and the measurement was conducted using a dynamic viscoelasticity measuring apparatus (DVA-220; manufactured by IT Keisoku Seigyo Co. Ltd.) for the measurement length of 15 mm. The measurements were performed for the temperature from room temperature to 450° C., under the conditions of 110 Hz and a rate of temperature increase of 4° C./min. At the inflection point of storage modulus (E), the glass transition temperature was defined as the intersection of the extrapolated line from the baseline below the glass transition temperature and the tangent at the maximum slope of the curve at the temperature equal to or greater than the inflection point.

15. Porosity

A 10 cm-square sample was prepared, and the sample volume ($cm^3$) and the mass (g) thereof were measured. The porosity (%) was calculated from the obtained results using the following formula.

Porosity=(1−mass/(resin density×sample volume))×100

16. Scratch Resistance

Both edges of the rolled battery separator obtained from working examples and comparative examples were subjected to slit process. The slit process was carried out by a slitter (Type WA177A, manufactured by Nishimura Seisakusho Corp.), under the condition of velocity of 20 m/min and tensile force of 50 N/100 mm. For the rolls which had contacts with the coated surface during the process, two hard chrome plated rolls (both were free rolls) were used. Then, while winding back the rolled battery separator after slit process, delaminated defects equal to or larger than 0.5 mm in major axes were counted under visual observation and observation using a magnifying glass of 10 times magnification with a scale (PEAK SCALE LUPE×10, manufactured by Tokai Sangyo Corp.). The results were evaluated according to the criteria below. The area of evaluation was 100 mm in width and 500 mm in length. (If the width was less than 100 mm, the evaluation length was adjusted so that the total evaluation area was same.)

Evaluation Criteria

○ (Exceptionally Good): Not more than 10.
Δ (Good): From 11 to 30.
x (Fail): Not less than 31.

Working Example 1

A polyethylene composition A (melting point 135° C.) was obtained by addition of 0.375 parts by weight of tetrakis-[methylene-3-(3,5-di-tert-butyl-4-hydroxyphenyl) propionate] methane as an antioxidant to 100 parts by weight of a composition, which comprises 18 wt. % of high molecular weight polyethylene (UHMWPE) with the weight average molecular weight of 2,000,000 and 82 wt. % of high density polyethylene (HDPE) with the weight average molecular weight of 350,000. 25 parts by weight of the polyethylene composition A was introduced into a biaxial extruder. Through the side-feeder of the biaxial extruder, 75 parts by weight of liquid paraffin was supplied, melt and kneaded and the polyethylene resin solution A was prepared inside the extruder.

Meanwhile, a polyethylene composition B (melting point 128° C.) was obtained by addition of 0.375 parts by weight of tetrakis-[methylene-3-(3,5-di-tert-butyl-4-hydroxyphenyl) propionate] methane as an antioxidant to 100 parts by weight of a composition, which comprises 17.5 wt. % of high molecular weight polyethylene (UHMWPE) with the weight average molecular weight of 2,000,000, 57.5 wt. % of high density polyethylene (HDPE) with the weight average molecular weight of 300,000 and 25 wt. % of liner low density polyethylene (ethylene 1-hexene copolymer) with MFR of 135 g/10 min and melting point of 124° C.

25 parts by weight of the polyethylene composition B was introduced into a biaxial extruder. Through the side-feeder of the biaxial extruder, 75 parts by weight of liquid paraffin was supplied, melt and kneaded and the polyethylene resin solution B was prepared inside the extruder.

The polyethylene resin solutions obtained, A and B, were coextruded from a multi-layer die with a layer configuration A/B/A and a solution ratio of 1/2/1 to a thickness of 785 μm at 190° C. The extrudate was taken up on a chill-roll of 800 mm diameter, inner cooling water of which was kept at 25° C., to form a multi-layer gel-like product. During this operation, a piece of polyester doctor blade was placed in contact with the chill-roll at the point between the point the multi-layer gel-like formed material departing from the chill-roll and the point multi-layer polyethylene resin solution extruded from the die contacting with the chill-roll, parallel to the transverse direction of the gel-like product, and scraped off the liquid paraffin deposited on the chill-roll surface. Subsequently, the multi-layer gel-like product was subjected to simultaneous biaxial stretching to 5×5 magnification at 116° C., followed by heatsetting at 120° C., and a stretched and molded material was obtained. The stretched and molded material obtained was washed with methylene chloride to extract and remove residual liquid paraffin, dried and a porous molded material was obtained. Then, the porous membrane was fixed on a tenter, shrunk by 10% only in TD (transverse direction) and subjected to heat treatment at 123° C. for 3 seconds. The multi-layer polyethylene porous membrane with thickness of 14 μm, porosity of 44%, average pore size of 0.16 μm and air permeation resistance of 195 sec/100 cc Air, pin puncture strength of 3260 mN, shut-down temperature of 130° C. and increase rate of air permeation resistance of 0.8 sec/100 cc Air/° C./20 μm was obtained.

Synthesis of Heat-Resistant Resin

In a four-necked flask equipped with a thermometer, a condenser and a nitrogen gas introducing tube, 1 mol of a trimellitic anhydride (TMA), 0.8 mol of o-tolidine diisocyanate (TODI), 0.2 mol of 2,4-tolidine diisocyanate (TDI) and 0.01 mol of potassium fluoride were introduced together with N-methyl-2-pyrrolidone to make up the solid concentration of 14%, and the mixture was stirred at 100° C. for 5 hours. Then the mixture was diluted with N-methyl-2-pyrrolidone to the solid concentration of 14% and a polyamideimide resin solution was synthesized. The logarithmic viscosity of the polyamideimide resin obtained was 1.35 dL/g and the glass transition temperature thereof was 320° C.

The polyamideimide resin solution, alumina particles of the average size of 0.5 μm, and N-methyl-2-pyrrolidone were mixed in the weight ratio of 26:34:40, respectively, introduced into a polypropylene container with zirconia oxide beads (trade designation: Torayceram (registered trademark), manufactured by Toray Industries, size 0.5 mm), and dispersed for 6 hours using a paint-shaker (manufactured by Toyo Seiki Seisakusho). Then, the varnish was obtained by filtering through a filter with filtering limit of 5 μm.

The varnish was coated by blade coating on the side of the multi-layer polyethylene porous membrane, which had been in contact with the chill-roll, passed through the low-humidity zone at temperature of 25° C. and the absolute humidity of 1.8 g/m³ for 8 seconds, followed by passing through the high-humidity zone at temperature of 25° C. and the absolute humidity of 12 g/m³ for 5 seconds. The treated membrane was immersed in the aqueous solution containing 5 wt. % N-methyl-2-pyrrolidone for 10 seconds. The treated membrane was further washed with pure water and was dried by passing through a hot-air drier at 70° C. to make the final thickness 5 μm thicker than that of the multi-layer polyethylene porous membrane. Thereby a battery separator was obtained.

Working Example 2

A battery separator was obtained in the same manner as Working Example 1, except that compounding ratios of high molecular weight polyethylene (UHMWPE) and high density polyethylene (HDPE) in the polyethylene compositions A and B were prepared according to the Table.

Working Example 3

A battery separator was obtained in the same manner as Working Example 2, except two pieces of polyester doctor blade were disposed to contact with the chill-roll with the interval of 20 mm.

Working Example 4

A battery separator was obtained in the same manner as Working Example 2, except three pieces of polyester doctor blade were disposed to contact with the chill-roll with the interval of 20 mm from each other.

Working Example 5

A battery separator was obtained in the same manner as Working Example 2, except the internal cooling water temperature of the chill-roll was kept at 35° C.

Working Example 6

A battery separator was obtained in the same manner as Working Example 2, except that the polyethylene resin solutions A and B were coextruded with a layer configuration B/A/B and a solution ratio of 1/2/1.

Working Examples 7 to 10

A battery separator was obtained in the same manner as Working Example 2, except that the low-melting point ingredient in the polyethylene composition B and the heat-setting temperature were selected according to the Table.

Working Example 11

A battery separator was obtained in the same manner as Working Example 2, except that the ratio of the polyethylene composition B and the liquid paraffin was adjusted according to the Table.

Working Example 12

A battery separator was obtained in the same manner as Working Example 2, except that the extruding amounts of the polyethylene solutions A and B had been adjusted so that the thickness of the multi-layer polyethylene porous membrane was the thickness described in the Table.

Working Example 13

A battery separator was obtained in the same manner as Working Example 2, except that a compounding ratio of high molecular weight polyethylene (UHMWPE) and high density polyethylene (HDPE) in the polyethylene composition A was adjusted according to the Table.

Working Example 14

A battery separator was obtained in the same manner as Working Example 1, except that compounding ratios of high molecular weight polyethylene (UHMWPE) and high density polyethylene (HDPE) in the polyethylene compositions A and B, and the ratio of each polyethylene composition B and the liquid paraffin had been adjusted according to the Table and the extruding amounts of the polyethylene solutions A and B had been adjusted so that the thickness was the thickness according to the Table.

Working Example 15

A battery separator was obtained in the same manner as Working Example 2, except that heatsetting was not performed after the stretching.

Working Example 16

A battery separator was obtained in the same manner as Working Example 2, except that the heat treatment temperature after the stretching was set to 123° C.

Working Example 17

A battery separator was obtained in the same manner as Working Example 6, except that the solution ratio of the polyolefin solutions A and B was 2/1/2.

Comparative Example 1

A battery separator was obtained in the same manner as Working Example 2, except that only the polyolefin solution A was used and extruded from a monolayer die at 190° C. to form a monolayer gel-like product and the monolayer gel-like product obtained was used instead of the multi-layer gel-like product.

Comparative Example 2

A battery separator was obtained in the same manner as Working Example 2, except that the low-melting point ingredient in the polyethylene composition B was changed according to the Table.

Comparative Example 3

A battery separator was obtained in the same manner as Working Example 1, except that compounding ratios of high molecular weight polyethylene (UHMWPE) and high density polyethylene (HDPE) in the polyethylene compositions A and B were adjusted according to the Table.

Comparative Example 4

A battery separator was obtained in the same manner as Working Example 2, except the internal cooling water temperature of the chill-roll was kept at 0° C. and the doctor blade was not used.

Comparative Example 5

A battery separator was obtained in the same manner as Working Example 2, except the polyethylene resin solution was immersed in water kept at 25° C. for 1 minute instead of the cooling polyethylene resin solution extruded from the die by the chill-roll.

Comparative Example 6

A battery separator was obtained in the same manner as Working Example 2, except that the liquid paraffin deposited on the chill-roll was not scraped off by the doctor blade upon obtaining the gel-like product by cooling the polyethylene resin solution extruded from the die on the chill-roll.

Comparative Example 7

A battery separator was obtained in the same manner as Working Example 2, except the internal cooling water temperature of the chill-roll was kept at 50° C.

The characteristics of the multi-layer polyolefin porous membranes and the battery separators obtained from the Working Examples 1 to 17 and Comparative Examples 1 to 7 are listed in Table 1.

TABLE 1-I

| | Layer A | | | Layer B | |
|---|---|---|---|---|---|
| | UHMWPE Amount Added (wt. %) | HDPE Amount Added (wt. %) | Resin Concentration (wt. %) | UHMWPE Amount Added (wt. %) | HDPE Amount Added (wt. %) |
| Working Example 1 | 18 | 82 | 25 | 17.5 | 57.5 |
| Working Example 2 | 30 | 70 | 25 | 17.5 | 57.5 |
| Working Example 3 | 30 | 70 | 25 | 17.5 | 57.5 |
| Working Example 4 | 30 | 70 | 25 | 17.5 | 57.5 |
| Working Example 5 | 30 | 70 | 25 | 17.5 | 57.5 |
| Working Example 6 | 30 | 70 | 25 | 17.5 | 57.5 |
| Working Example 7 | 30 | 70 | 25 | 17.5 | 57.5 |
| Working Example 8 | 30 | 70 | 25 | 17.5 | 57.5 |
| Working Example 9 | 30 | 70 | 25 | 17.5 | 57.5 |
| Working Example 10 | 30 | 70 | 25 | 17.5 | 57.5 |
| Working Example 11 | 30 | 70 | 25 | 17.5 | 55 |
| Working Example 12 | 30 | 70 | 25 | 17.5 | 57.5 |
| Working Example 13 | 2 | 98 | 25 | 17.5 | 57.5 |
| Working Example 14 | 40 | 60 | 30 | 30 | 50 |
| Working Example 15 | 30 | 70 | 25 | 17.5 | 57.5 |
| Working Example 16 | 30 | 70 | 25 | 17.5 | 57.5 |
| Working Example 17 | 30 | 70 | 25 | 17.5 | 57.5 |
| Comparative Example 1 | 30 | 70 | 25 | — | — |
| Comparative Example 2 | 30 | 70 | 25 | 17.5 | 57.5 |
| Comparative Example 3 | 0 | 100 | 25 | 17.5 | 57.5 |
| Comparative Example 4 | 30 | 70 | 25 | 17.5 | 57.5 |
| Comparative Example 5 | 30 | 70 | 25 | 17.5 | 57.5 |
| Comparative Example 6 | 30 | 70 | 25 | 17.5 | 57.5 |
| Comparative Example 7 | 30 | 70 | 25 | 17.5 | 57.5 |

TABLE 1-II

| | Layer B | | | | |
|---|---|---|---|---|---|
| | Low-Melting Point Ingredient | | | | Resin |
| | Ingredient | Melting Point (° C.) | MFR (g/10 min) | Amount Added (wt. %) | Concentration (wt. %) |
| Working Example 1 | Ethylene•1-hexene Copolymer | 124 | 135 | 25 | 25 |
| Working Example 2 | Ethylene•1-hexene Copolymer | 124 | 135 | 25 | 25 |
| Working Example 3 | Ethylene•1-hexene Copolymer | 124 | 135 | 25 | 25 |
| Working Example 4 | Ethylene•1-hexene Copolymer | 124 | 135 | 25 | 25 |
| Working Example 5 | Ethylene•1-hexene Copolymer | 124 | 135 | 25 | 25 |
| Working Example 6 | Ethylene•1-hexene Copolymer | 124 | 135 | 25 | 25 |
| Working Example 7 | Ethylene•1-hexene Copolymer | 121 | 55 | 25 | 25 |
| Working Example 8 | Low Density Polyethylene | 122 | 28 | 25 | 25 |
| Working Example 9 | Ethylene•1-hexene Copolymer | 123 | 50 | 25 | 25 |
| Working Example 10 | Ethylene•1-hexene Copolymer | 125 | 136 | 25 | 25 |
| Working Example 11 | Ethylene•1-hexene Copolymer | 124 | 135 | 27.5 | 25 |
| Working Example 12 | Ethylene•1-hexene Copolymer | 124 | 135 | 25 | 25 |
| Working Example 13 | Ethylene•1-hexene Copolymer | 124 | 135 | 25 | 25 |
| Working Example 14 | Ethylene•1-hexene Copolymer | 124 | 135 | 20 | 30 |
| Working Example 15 | Ethylene•1-hexene Copolymer | 124 | 135 | 25 | 25 |
| Working Example 16 | Ethylene•1-hexene Copolymer | 124 | 135 | 25 | 25 |
| Working Example 17 | Ethylene•1-hexene Copolymer | 124 | 135 | 25 | 25 |
| Comparative Example 1 | — | — | — | — | — |
| Comparative Example 2 | Ethylene•1-hexene Copolymer | 123 | 3.2 | 25 | 25 |
| Comparative Example 3 | Ethylene•1-hexene Copolymer | 124 | 135 | 25 | 25 |
| Comparative Example 4 | Ethylene•1-hexene Copolymer | 124 | 135 | 25 | 25 |
| Comparative Example 5 | Ethylene•1-hexene Copolymer | 124 | 135 | 25 | 25 |
| Comparative Example 6 | Ethylene•1-hexene Copolymer | 124 | 135 | 25 | 25 |
| Comparative Example 7 | Ethylene•1-hexene Copolymer | 124 | 135 | 25 | 25 |

TABLE 1-III

| | Manufacturing Conditions | | | | |
|---|---|---|---|---|---|
| | Layer Configuration | Solution Ratio | Chill-Roll Temperature (° C.) | Forming Solvent scraping Number of Blades | Heat Setting Temperature (° C.) |
| Working Example 1 | A/B/A | 1/2/1 | 25 | 1 | 120 |
| Working Example 2 | A/B/A | 1/2/1 | 25 | 1 | 120 |
| Working Example 3 | A/B/A | 1/2/1 | 25 | 2 | 120 |
| Working Example 4 | A/B/A | 1/2/1 | 25 | 3 | 120 |
| Working Example 5 | A/B/A | 1/2/1 | 35 | 1 | 120 |
| Working Example 6 | B/A/B | 1/2/1 | 25 | 1 | 120 |
| Working Example 7 | A/B/A | 1/2/1 | 25 | 1 | 117 |
| Working Example 8 | A/B/A | 1/2/1 | 25 | 1 | 118 |
| Working Example 9 | A/B/A | 1/2/1 | 25 | 1 | 119 |
| Working Example 10 | A/B/A | 1/2/1 | 25 | 1 | 121 |

TABLE 1-III-continued

| | Manufacturing Conditions | | | | |
|---|---|---|---|---|---|
| | Layer Configuration | Solution Ratio | Chill-Roll Temperature (° C.) | Forming Solvent scraping Number of Blades | Heat Setting Temperature (° C.) |
| Working Example 11 | A/B/A | 1/2/1 | 25 | 1 | 120 |
| Working Example 12 | A/B/A | 1/2/1 | 25 | 1 | 120 |
| Working Example 13 | A/B/A | 1/2/1 | 25 | 1 | 120 |
| Working Example 14 | A/B/A | 1/2/1 | 25 | 1 | 120 |
| Working Example 15 | A/B/A | 1/2/1 | 25 | 1 | No Heatsetting |
| Working Example 16 | A/B/A | 1/2/1 | 25 | 1 | 123 |
| Working Example 17 | B/A/B | 2/1/2 | 25 | 1 | 120 |
| Comparative Example 1 | A | — | 25 | 1 | 120 |
| Comparative Example 2 | A/B/A | 1/2/1 | 25 | 1 | 120 |
| Comparative Example 3 | A/B/A | 1/2/1 | 25 | 1 | 120 |
| Comparative Example 4 | A/B/A | 1/2/1 | 0 | 0 | 120 |
| Comparative Example 5 | A/B/A | 1/2/1 | 25 (water bath) | — | 120 |
| Comparative Example 6 | A/B/A | 1/2/1 | 25 | 0 | 120 |
| Comparative Example 7 | A/B/A | 1/2/1 | 50 | 1 | 120 |

TABLE 2-I

| | Characteristics | | | |
|---|---|---|---|---|
| | Thickness of Multi-layer Polyolefin Porous Membrane (μm) | Shut-down Temperature (° C.) | Thickness Variation (%) | Maximum Shrinkage in Transverse Direction (%) | Increase Rate in Air Permeation Resistance (sec/100 cc Air/° C./20 μm) |
| Working Example 1 | 14 | 130 | 1.6 | 1.1 | 0.8 |
| Working Example 2 | 14 | 128 | 1 | 1.5 | 0.9 |
| Working Example 3 | 14 | 128 | 1.3 | 1.4 | 0.9 |
| Working Example 4 | 14 | 128 | 1.3 | 1.5 | 0.9 |
| Working Example 5 | 14 | 127 | 0.9 | 1.6 | 0.8 |
| Working Example 6 | 14 | 126 | 1.3 | 1.2 | 1.1 |
| Working Example 7 | 14 | 128 | 1.9 | 2.1 | 1.4 |
| Working Example 8 | 14 | 128 | 2.1 | 3.5 | 1.5 |
| Working Example 9 | 14 | 129 | 2.0 | 2.3 | 1.4 |
| Working Example 10 | 14 | 131 | 1.4 | 1.4 | 0.9 |
| Working Example 11 | 14 | 132 | 1.3 | 1.3 | 0.9 |
| Working Example 12 | 9 | 128 | 1.2 | 1.2 | 0.9 |
| Working Example 13 | 14 | 128 | 1.9 | 1.0 | 1.0 |
| Working Example 14 | 7 | 128 | 1.9 | 2.0 | 0.9 |
| Working Example 15 | 14 | 128 | 1.2 | 6.3 | 0.9 |
| Working Example 17 | 14 | 128 | 1.2 | 0.6 | 0.9 |
| Working Example 16 | 14 | 126 | 1.3 | 0.9 | 1.3 |
| Comparative Example 1 | 14 | 137 | 0.9 | 1.4 | 1.1 |
| Comparative Example 2 | 14 | 128 | 3.8 | 13.2 | 1.7 |
| Comparative Example 3 | 14 | 128 | 2.8 | 0.8 | 1.7 |
| Comparative Example 4 | 14 | 128 | 1.5 | 1.5 | 0.9 |
| Comparative Example 5 | 14 | 128 | 1.4 | 1.4 | 0.9 |
| Comparative Example 6 | 14 | 128 | 1.6 | 1.5 | 0.9 |
| Comparative Example 7 | 14 | 128 | 1.5 | 1.3 | 0.9 |

TABLE 2-II

| | Characteristics | | | |
|---|---|---|---|---|
| | Air Permeation Resistance of Multi-layer Polyolefin Porous Membrane (X) (sec/100 cc Air) | Air Permeation Resistance (Y) of Battery Separator (sec/100 cc Air) | Air Permeation Resistance Increase [(Y)-(X)] (sec/100 cc Air) | Number of Protrusions (Number of Protrusions/cm²) |
| Working Example 1 | 195 | 243 | 48 | 41 |
| Working Example 2 | 169 | 223 | 54 | 66 |
| Working Example 3 | 168 | 218 | 50 | 70 |
| Working Example 4 | 167 | 218 | 51 | 73 |
| Working Example 5 | 162 | 215 | 53 | 67 |
| Working Example 6 | 179 | 243 | 64 | 40 |
| Working Example 7 | 169 | 247 | 78 | 66 |
| Working Example 8 | 195 | 281 | 86 | 66 |
| Working Example 9 | 176 | 253 | 77 | 66 |
| Working Example 10 | 164 | 214 | 50 | 66 |
| Working Example 11 | 168 | 222 | 54 | 66 |
| Working Example 12 | 110 | 165 | 55 | 72 |

TABLE 2-II-continued

| | Characteristics | | | |
|---|---|---|---|---|
| | Air Permeation Resistance of Multi-layer Polyolefin Porous Membrane (X) (sec/ 100 cc Air) | Air Permeation Resistance (Y) of Battery Separator (sec/ 100 cc Air) | Air Permeation Resistance Increase [(Y)-(X)] (sec/ 100 cc Air) | Number of Protrusions (Number of Protrusions/ cm$^2$) |
| Working Example 13 | 152 | 218 | 66 | 8 |
| Working Example 14 | 167 | 218 | 51 | 100 |
| Working Example 15 | 165 | 220 | 54 | 67 |
| Working Example 17 | 520 | 575 | 54 | 65 |
| Working Example 16 | 312 | 400 | 88 | 40 |
| Comparative Example 1 | 198 | 261 | 63 | 66 |
| Comparative Example 2 | 382 | 481 | 99 | 66 |
| Comparative Example 3 | 380 | 476 | 96 | 0 |
| Comparative Example 4 | 171 | 224 | 53 | 0 |
| Comparative Example 5 | 173 | 226 | 53 | 2 |
| Comparative Example 6 | 168 | 221 | 53 | 0 |
| Comparative Example 7 | 175 | 227 | 52 | 0 |

TABLE 2-III

| | Characteristics | | |
|---|---|---|---|
| | Average Protrusion Height (μm) | 0° Peel Strength (N/15 mm) | Scratch Resistance |
| Working Example 1 | 0.7 | 118 | ○ |
| Working Example 2 | 0.6 | 113 | ○ |
| Working Example 3 | 0.7 | 119 | ○ |
| Working Example 4 | 0.7 | 119 | ○ |
| Working Example 5 | 0.6 | 114 | ○ |
| Working Example 6 | 1.0 | 119 | ○ |
| Working Example 7 | 0.7 | 119 | ○ |
| Working Example 8 | 0.7 | 119 | ○ |
| Working Example 9 | 0.7 | 119 | ○ |
| Working Example 10 | 0.7 | 119 | ○ |
| Working Example 11 | 0.7 | 119 | ○ |
| Working Example 12 | 0.6 | 116 | ○ |
| Working Example 13 | 1.7 | 121 | ○ |
| Working Example 14 | 0.5 | 113 | ○ |
| Working Example 15 | 0.6 | 114 | ○ |
| Working Example 17 | 0.6 | 113 | ○ |
| Working Example 16 | 1.0 | 119 | ○ |
| Comparative Example 1 | 0.6 | 113 | ○ |
| Comparative Example 2 | 0.7 | 119 | ○ |
| Comparative Example 3 | — | 90 | x |
| Comparative Example 4 | — | 92 | x |
| Comparative Example 5 | 0.4 | 93 | Δ |
| Comparative Example 6 | — | 89 | x |
| Comparative Example 7 | — | 91 | x |

REFERENCE SIGNS LIST

1 Battery separator
2 Multi-layer polyolefin porous membrane
3 Modified porous layer
4 Double-sided adhesive tape
5 Aluminum plate
6 Polyethylene spherulite nucleus
7 Die
8 Polyolefin resin solution
9 Chill-roll
10 Doctor blade
11 Gel-like product

What is claimed is:

1. A multi-layer polyolefin porous membrane comprising:
at least two layers,
wherein the multi-layer polyolefin porous membrane has a shut-down temperature in a range of 128 to 135° C., a rate of increase in air permeation resistance from 30° C. to 105° C. scaled to 20 μm thickness less than 1.5 sec/100 cc Air/° C., and a thickness not more than 20 μm; and
a plurality of protrusions of polyolefin having a size W within a range of 5 μm≤W≤50 μm and a height H within a range of 0.5 μm≤H, and wherein the protrusions are randomly disposed on one side of the multi-layer polyolefin porous membrane in a density not less than 3/cm$^2$ and not more than 200/cm$^2$.

2. The multi-layer polyolefin porous membrane according to claim 1, wherein the air permeation resistance scaled to 20 μm thickness is in a range of 50 to 300 sec/100 cc Air.

3. The multi-layer polyolefin porous membrane according to claim 1, wherein a maximum shrinkage of the multi-layer polyolefin porous membrane in a transverse direction is less than 5%.

4. The multi-layer polyolefin porous membrane according to claim 1, wherein at least one of the at least two layers comprises a resin with a melt flow rate in a range of 25 to 150 g/10 min and a melting point not less than 120° C. and less than 130° C.

5. A battery separator, comprising:
a multi-layer polyolefin porous membrane, comprising:
at least two layers, and
a plurality of protrusions on a side, wherein the protrusions have a size W within a range of 5 μm≤W≤50 μm and a height H within a range of 0.5 μm≤H, and wherein the protrusions are randomly disposed on one side of the multi-layer polyolefin porous membrane in a density not less than 3/cm$^2$ and not more than 200/cm$^2$,
wherein the multi-layer polyolefin porous membrane has a shut-down temperature in a range of 128 to 135° C., a rate of increase in air permeation resistance from 30° C. to 105° C. scaled to 20 μm thickness less than 1.5 sec/100 cc Air/° C., and a thickness not more than 20 μm; and
a modified porous layer laminated on at least on the side of the multi-layer polyolefin porous membrane having the protrusions.

6. A method of manufacturing a multi-layer polyolefin porous membrane, the method comprising:
adding a forming solvent to polyolefin resin to form a polyolefin resin solution;
melting and kneading the polyolefin resin solution;
extruding the melted and kneaded polyolefin solution through a die;
chilling at least a portion of the extruded polyolefin solutions to form a multi-layer gel-like product with a chill-roll having a surface, wherein, during the chilling, the forming solvent on the chill-roll is removed;

stretching the gel-like product in MD (the machine direction) and in TD (the transverse direction) to obtain a stretched and molded material;

extracting the stretched and molded material;

removing the forming solvent from the stretched and molded material;

drying the stretched and molded material to obtain a multi-layer porous molded material; and treating the multi-layer porous molded material with heat to obtain a multi-layer polyolefin porous membrane, wherein the multi-layer polyolefin porous membrane comprises at least two layers, and has a shut-down temperature in a range of 128 to 135° C., a rate of increase in air permeation resistance from 30° C. to 105° C. scaled to 20 μm thickness less than 1.5 sec/100 cc Air/° C., and a thickness not more than 20 μm.

7. The method of manufacturing according to claim 6, wherein the forming solvent is removed from the chill-roll with a doctor blade.

* * * * *